United States Patent
Rowley

(10) Patent No.: US 12,094,053 B2
(45) Date of Patent: *Sep. 17, 2024

(54) SYSTEMS AND ASSOCIATED METHODS FOR CREATING A VIEWING EXPERIENCE

(71) Applicant: LiveCGI, Inc., Wilmington, DE (US)

(72) Inventor: Marc Rowley, Westport, CT (US)

(73) Assignee: LiveCGI, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/033,496

(22) Filed: Sep. 25, 2020

(65) Prior Publication Data
US 2021/0012557 A1    Jan. 14, 2021

Related U.S. Application Data

(63) Continuation of application No. 15/994,840, filed on May 31, 2018, now Pat. No. 10,789,764.
(Continued)

(51) Int. Cl.
*G06T 15/20* (2011.01)
*G06F 3/01* (2006.01)
(Continued)

(52) U.S. Cl.
CPC ............ *G06T 15/205* (2013.01); *G06F 3/012* (2013.01); *G06F 3/013* (2013.01); *G06F 3/016* (2013.01); *G06F 3/04815* (2013.01); *G06F 3/165* (2013.01); *G06T 5/70* (2024.01); *G06T 7/292* (2017.01); *G06T 7/73* (2017.01); *G06T 17/00* (2013.01); *G06T 19/00* (2013.01); *G06T 19/20* (2013.01); *G06F 3/16* (2013.01); *G06T 2207/30196* (2013.01); *G06T 2207/30221* (2013.01); *G06T 2215/16* (2013.01); *G06T 2219/024* (2013.01); *H04N 23/90* (2023.01)

(58) Field of Classification Search
CPC ...... G06F 3/012; G06F 3/04815; G06F 3/013; G06F 3/016; G06T 15/205; G06T 19/00; G06T 7/73; G06T 17/00; G06T 19/20
See application file for complete search history.

(56) References Cited

U.S. PATENT DOCUMENTS 6,567,116 B1   5/2003  Aman
2007/0239611 A1  10/2007  Blum
(Continued)

OTHER PUBLICATIONS

U.S. Appl. No. 17/090,664, Non-Final Office Action dated Mar. 1, 2022.
(Continued)

*Primary Examiner* — Sing-Wai Wu
(74) *Attorney, Agent, or Firm* — Cozen O'Connor

(57) ABSTRACT

Systems and processes generate a viewing experience by determining location data and movement data of (a) at least one object and (b) at least one participant within an event area. A three-dimensional model of the event area, the participant and the object is determined based upon the location data and the movement data. A viewpoint of a spectator defines an origin, relative to the three-dimensional model, and a direction of the viewing experience. The viewing experience is generated for the viewpoint at least in part from the three-dimensional model to include one or more of augmented reality, mixed reality, extended reality, and virtual reality.

20 Claims, 21 Drawing Sheets

Related U.S. Application Data

(60) Provisional application No. 62/513,198, filed on May 31, 2017.

(51) Int. Cl.
*G06F 3/04815* (2022.01)
*G06F 3/16* (2006.01)
*G06T 5/70* (2024.01)
*G06T 7/292* (2017.01)
*G06T 7/73* (2017.01)
*G06T 17/00* (2006.01)
*G06T 19/00* (2011.01)
*G06T 19/20* (2011.01)
*H04N 23/90* (2023.01)

(56) References Cited

U.S. PATENT DOCUMENTS

| | | |
|---|---|---|
| 2010/0026809 A1 | 2/2010 | Curry |
| 2010/0113159 A1* | 5/2010 | Chapman ............ A63F 13/12 463/42 |
| 2013/0147785 A1 | 6/2013 | Patiejunas |
| 2014/0223313 A1 | 8/2014 | Aebi |
| 2015/0363648 A1 | 12/2015 | Li et al. |
| 2017/0173466 A1 | 6/2017 | Fahmie |
| 2017/0178298 A1 | 6/2017 | Bonnier |
| 2017/0232300 A1 | 8/2017 | Tran et al. |
| 2017/0318262 A1 | 11/2017 | Safaei et al. |
| 2017/0359523 A1* | 12/2017 | Rubinstein ............ G06T 7/30 |
| 2018/0108172 A1* | 4/2018 | Huston ............ G06T 15/205 |
| 2018/0132014 A1 | 5/2018 | Khazanov et al. |
| 2018/0133603 A1 | 5/2018 | Ninoles |
| 2018/0220125 A1 | 8/2018 | Tamir |
| 2020/0037034 A1 | 1/2020 | Greyling |

OTHER PUBLICATIONS

U.S. Appl. No. 17/090,664, Notice of Allowance dated Aug. 24, 2022.
U.S. Appl. No. 17/229,583, Non-Final Office Action dated Nov. 9, 2022.
U.S. Appl. No. 17/229,583 Notice of Allowance dated Oct. 23, 2023, 10 pages.
U.S. Appl. No. 62/452,694, filed Jan. 31, 2017.

* cited by examiner

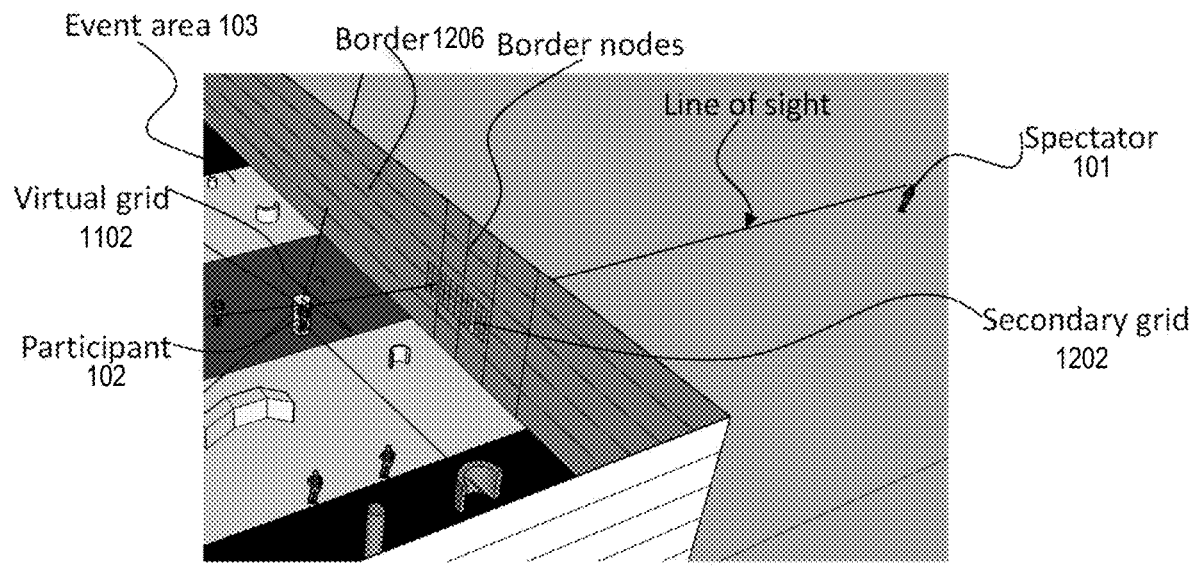
*FIG. 12A*
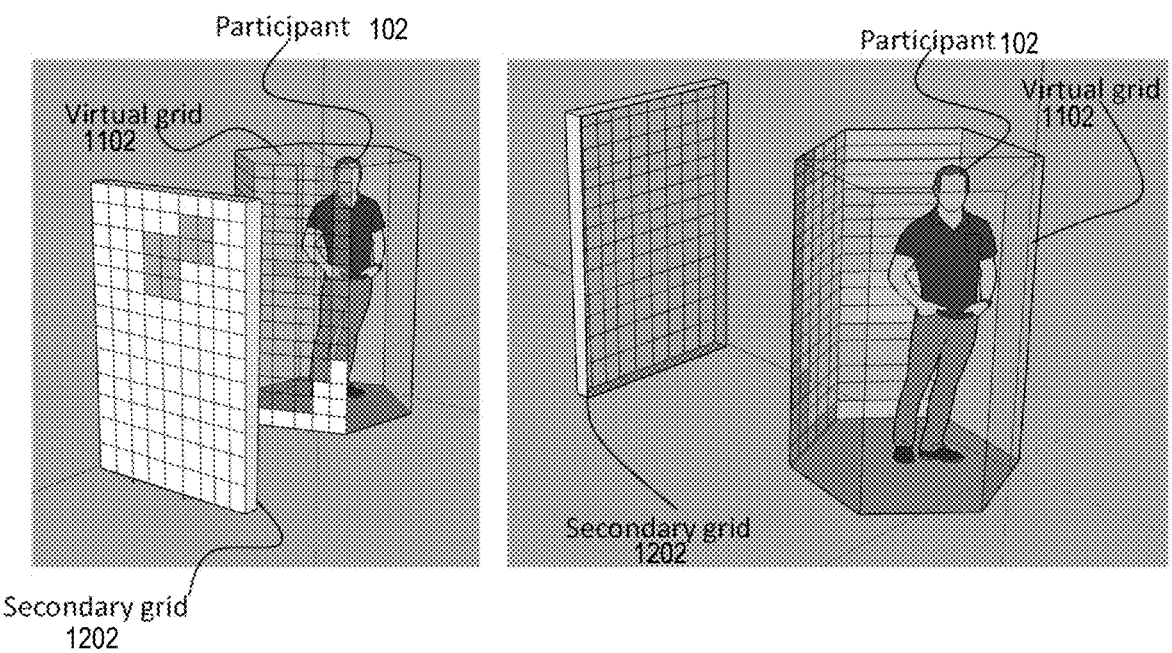
*FIG. 12B*  *FIG. 12C*

SYSTEMS AND ASSOCIATED METHODS FOR CREATING A VIEWING EXPERIENCE

RELATED APPLICATIONS

This application is a continuation of U.S. patent application Ser. No. 15/994,840, filed May 31, 2018, which claims priority to U.S. Patent Application Ser. No. 62/513,198, filed May 31, 2017, and which are both incorporated herein by reference in their entirety.

BACKGROUND

Viewing a sport using a feed from a camera positioned and/or controlled to capture action of the sport provides a perspective of the action limited by camera position. Multiple cameras may be used to provide multiple perspectives, but each of these perspectives is still limited by the individual camera position.

SUMMARY

In one embodiments, a process generates a viewing experience by determining location data and movement data of (a) at least one object and (b) at least one participant within an event area; determining a three-dimensional model of the event area, the participant and the object based upon the location data and the movement data; determining a viewpoint of a spectator, the viewpoint defining an origin, relative to the three-dimensional model, and a direction of the viewing experience; and generating the viewing experience for the viewpoint at least in part from the three-dimensional model.

In certain embodiments, generating includes blurring parts of the viewing experience that are less important to reduce latency of generating the viewing experience.

In certain embodiments, determining the location data and the movement data further includes capturing light-field data relative to the object and the participant to enhance the three-dimensional model.

In certain embodiments, determining the viewpoint further includes capturing light-field data relative to the viewpoint to enhance the three-dimensional model, wherein the light-field data comprises light intensity, light direction, and light color.

In certain embodiments, determining the location data and the movement data further includes determining relative location data, of the object and the participant, with respect to one or more of (i) a permanent object location at the event area, (ii) a second object at the event area, (iii) a second participant at the event area, and (iv) a secondary grid at the event area.

In certain embodiments, determining the viewpoint further includes determining relative location data of the viewpoint, with respect to one or more of (i) a permanent object location at the arena, (ii) the at least one object, (iii) the at least one participant, and (iv) a secondary grid at the arena.

In certain embodiments, the secondary grid is a secondary virtual grid positioned between the viewpoint and the object or the participant.

Certain embodiments further include receiving primary images from a plurality of cameras positioned at the event area; and mapping at least one of the primary images to the three-dimensional model.

In certain embodiments, mapping further includes mapping light field data to the three-dimensional model.

In certain embodiments, determining the viewpoint further includes determining, based on viewing directives received from the spectator, a virtual camera defining a virtual origin, relative to the three-dimensional model, and a virtual direction of the viewing experience.

Certain embodiments further include: generating a virtual image, having the object and/or the participant, based upon (i) the three-dimensional model and (ii) the viewpoint or the virtual camera; and sending one or both of (i) the three-dimensional model and (ii) at least a portion of the virtual image to a viewing device configured to provide the viewing experience.

Certain embodiments further include: determining when an obstruction is located between (i) one of the viewpoint and the virtual camera and (ii) one of the object and the participant; and adding at least a portion of the virtual image, corresponding to a location of the obstruction, to the viewing experience to at least partially remove the obstruction from the viewing experience.

: determining, within the three-dimensional model and around each of the participant and the object, a virtual grid having a plurality of cells; and mapping at least a portion of one of the primary images identified by at least one cell of the virtual grid corresponding to the participant or object.

In certain embodiments, mapping further includes mapping at least a portion of one of the primary images identified by a section of a secondary grid corresponding to the participant or object.

Certain embodiments further include adding visual special effects and audible special effects to the viewing experience, the special effects being generated based upon one or both of (i) the location data and the movement data of the object and/or the participant and (ii) an occurrence of interest detected within the event area.

Certain embodiments further include: receiving sound feeds from a plurality of microphones positioned at the event area; mapping the sound feeds to the three-dimensional model; and generating the viewing experience to include sounds based upon the three-dimensional model.

Certain embodiments further include providing haptic feedback to the spectator based at least in part upon one or more of (a) the virtual camera and the location data of the object and the participant, (b) an occurrence of interest detected within the event area and the visual and audio special effects, and (c) feedback from other spectators sharing the viewing experience.

In another embodiment, a system generates a free-viewpoint experience for a spectator. The system includes a plurality of cameras positioned at an event area to capture primary images of the event area; tracking apparatus configured to determine location data and movement data of (a) at least one object and (b) at least one participant within the event area; and a server having a processor and memory storing machine readable instructions that when executed by the processor are capable of: receiving the primary images from the plurality of cameras; determining a three-dimensional model of the event area, the participant and the object based upon the location data and the movement data of the participant and the object; and sending an output to a viewing device for providing the free-viewpoint experience, having at least one virtual image, to the spectator.

In certain embodiments, the system further includes machine readable instructions that, when processed by the server, are capable of: determining, based on viewing directives received from the spectator, a virtual camera defining an origin within the three-dimensional model and a direction of the free-viewpoint experience; and generating the at least one virtual image having a portion of the three-dimensional model, based upon the virtual camera.

In certain embodiments, the output includes one or both of the virtual image, and the three-dimensional model.

In another embodiment, a process generates a viewing experience. The process: determines location data and movement data of (a) at least one object and (b) at least one participant within an event area; determines a three-dimensional model of the event area, the participant and the object based upon the location data and movement data; determines a viewpoint of the spectator, the viewpoint defining an origin, relative to the three-dimensional model, and a direction of the viewing experience; and generates the viewing experience at least in part from the three-dimensional model.

In certain embodiments, the generating includes blurring parts of the viewing experience that are less important to reduce latency of generating the viewing experience.

In certain embodiments, determining location data and movement data further includes capturing light-field data relative to the object and the participant to enhance the three-dimensional model.

In certain embodiments, determining a viewpoint further includes capturing light-field data relative to the viewpoint to enhance the three-dimensional model.

In certain embodiments, the light field data includes light intensity, light direction, and light color.

In certain embodiments, determining location data and movement data further includes determining relative location data, of the object and the participant, with respect to one or more of (i) a permanent object location at the arena, (ii) a second object at the arena, (iii) a second participant at the arena, and (iv) a secondary grid at the arena.

In certain embodiments, determining a viewpoint further includes determining relative location data, of the viewpoint, with respect to one or more of (i) a permanent object location at the arena, (ii) the at least one object, (iii) the at least one participant, and (iv) a secondary grid at the arena.

In certain embodiments, the secondary grid is a secondary virtual grid positioned between the viewpoint and the object or the participant.

In certain embodiments, determining location data and movement data further includes triangulating signals that are one or the combination of (i) emitted from and (ii) received by an object location unit and a participant location unit; the signals selected from the group consisting of sound, radio waves, microwaves, ultraviolet light, visible light, infrared light, and any combinations thereof.

In certain embodiments, determining a viewpoint further includes triangulating signals that are one or the combination of (i) emitted from and (ii) received by a spectator location unit; the signals selected from the group consisting of sound, radio waves, microwaves, ultraviolet light, visible light, infrared light, and any combinations thereof.

Certain embodiments further include: receiving primary images from a plurality of cameras positioned at an event area; and mapping at least one of the primary images to the three-dimensional model.

In certain embodiments, mapping further includes mapping light field data to the three-dimensional model.

In certain embodiments, determining the viewpoint further includes: determining, based on viewing directives received from the spectator, a virtual camera defining a virtual origin, relative to the three-dimensional model, and a virtual direction of the viewing experience.

Certain embodiments further include: within the three-dimensional model, determining, around each of the participant and the object, a virtual grid having a plurality of cells; and the step of mapping further comprising: mapping at least a portion of one of the primary images identified by at least one cell of the virtual grid corresponding to the participant or object.

In certain embodiments, mapping further includes: mapping at least a portion of one of the primary images identified by a section of the secondary grid corresponding to the participant or object.

In certain embodiments, mapping further includes interpolating between any two of the primary images.

Certain embodiments further include generating a virtual image, having the object and/or the participant, based upon (i) the three-dimensional model and (ii) the viewpoint or the virtual camera.

Certain embodiments further include sending the location data of the object and the participant to a viewing device configured to provide the viewing experience.

Certain embodiments further include sending one or both of (i) the three-dimensional model and (ii) at least a portion of the virtual image to a viewing device configured to provide the viewing experience.

Certain embodiments further include: determining an occurrence of interest; and adding visual special effects and audible special effects to the viewing experience, the special effects based on (i) the location data and movement data of the object and/or the participant and (ii) the occurrence of interest.

Certain embodiments further include determining when an obstruction is located between (i) the viewpoint and (ii) the object or the participant.

Certain embodiments further include determining when an obstruction is located between (i) the virtual camera and (ii) the object or the participant.

Certain embodiments further include adding at least a portion of the virtual image, corresponding to the location of the obstruction, to the viewing experience.

Certain embodiments further include removing the obstruction from the viewing experience.

Certain embodiments further include receiving sound feeds from a plurality of microphones positioned at the event area; mapping the sound feeds to the three-dimensional model; and determining the viewing experience to include sounds based upon the three-dimensional model.

Certain embodiments further include providing haptic feedback to the spectator based on the virtual camera and the location data of the object and the participant.

Certain embodiments further include providing haptic feedback to the spectator based on the occurrence of interest and the visual and audio special effects.

Certain embodiments further include providing haptic feedback to the spectator based on feedback from other spectators sharing the viewing experience.

In another embodiment, a system generates a viewing experience for a spectator. The system includes event tracking apparatus configured to determine location data and movement data of (i) an object and (ii) a participant within an event area; spectator tracking apparatus configured to determine spectator location data and spectator viewing direction data; and a server having a processor and memory storing machine readable instructions that when executed by the processor are capable of: determining a three-dimensional model of the event area, the model having the participant and the object based upon the location data and movement data of the participant and the object; and determining a spectator viewpoint based on the spectator location data and spectator viewing direction data; the viewpoint defining an origin, relative to the three-dimensional model, and a direction of the viewing experience.

Certain embodiments further include a plurality of cameras positioned at an event area to capture primary images of the event area.

In certain embodiments, the event tracking apparatus determines location data and movement data of the participant and the object using triangulation of signals that are one or the combination of (i) emitted from and (ii) received by an object location unit and a participant location unit; the object location unit and the participant location unit attached to the object and to the participant, respectively; the signals being selected from the group consisting of sound, radio waves, microwaves, ultraviolet light, visible light, infrared light, and any combinations thereof.

In certain embodiments, the event tracking apparatus determines location data and movement data of the participant and the object using light field data captured by one or the combination of (i) the event tracking apparatus and (ii) the object location unit and the participant location unit.

In certain embodiments, the spectator tracking apparatus determines spectator location data and spectator viewing direction data using triangulation of signals that are one or the combination of (i) emitted from and (ii) received by a spectator location unit; the signals selected from the group consisting of sound, radio waves, microwaves, ultraviolet light, visible light, infrared light, and any combinations thereof.

In certain embodiments, the spectator tracking apparatus determines spectator location data and spectator viewing direction data using light field data captured by one or the combination of (i) the spectator tracking apparatus and (ii) the spectator location unit.

In certain embodiments, the light field data includes light intensity, light direction, and light color.

In certain embodiments, the machine-readable instructions, when processed by the server, are further capable of: determining an occurrence of interest based on the three-dimensional model and the spectator viewpoint; the occurrence having at least an identity and coordinates relative to the three-dimensional model.

Certain embodiments, further includes a software module that when executed by a processor of a viewing device is capable of: augmenting the viewing experience for the spectator based on the occurrence of interest received from the server.

In certain embodiments, the software module augments the viewing experience via providing visual special effects and audible special effects.

In certain embodiments, the machine readable instructions, when processed by the server, are further capable of: receiving the primary images from the plurality of cameras; determining, within the three-dimensional model, around each of the participant and the object, a virtual grid having a plurality of cells; mapping at least a portion of one of the primary images identified by at least one cell of the virtual grid corresponding to the participant or object; and generating a virtual image having a portion of the three-dimensional model corresponding to the participant or the object based on the spectator viewpoint.

In certain embodiments, the machine-readable instructions, when processed by the server, are further capable of: correcting the virtual image based on at least a portion of one of the primary images identified by at least one cell of a secondary grid corresponding to the participant or object; the secondary grid positioned between the viewpoint and the participant or object.

In certain embodiments, the secondary grid is a virtual secondary grid.

In certain embodiments, the machine-readable instructions, when processed by the server, are further capable of: interpolating between portions of the primary images.

In certain embodiments, the software module further augments the viewing experience via providing the virtual image received from the server.

In certain embodiments, the machine-readable instructions, when processed by the server, are further capable of: determining, based on the three-dimensional model and the spectator viewpoint, when an obstruction is located between (i) the viewpoint and (ii) the object or the participant; and sending directives to the software module to display at least a portion of the virtual image corresponding to the obstruction.

In certain embodiments, the machine-readable instructions, when processed by the server, are further capable of: receiving sound feeds from a plurality of microphones positioned at the event area; mapping the sound feeds to the three-dimensional model; and generating a sound output based on one or the combination of (i) the spectator viewpoint and (ii) the occurrence of interest.

In certain embodiments, the software module further augments the viewing experience via providing the sound output received from the server.

In certain embodiments, the software module further augments the viewing experience via providing haptic feedback based on the occurrence of interest.

In another embodiment, a system generates a free-viewpoint experience for a spectator. The system includes a plurality of cameras positioned at an event area to capture primary images of the event area; tracking apparatus configured to determine location data and movement data of (a) at least one object and (b) at least one participant within the event area; and a server having a processor and memory storing machine readable instructions that when executed by the processor are capable of: receiving the primary images from the plurality of cameras; determining a three-dimensional model of the event area, the participant and the object based upon the location data and movement data of the participant and the object; and sending an output to a viewing device for providing the free-viewpoint experience, having at least one virtual image, to the spectator.

In certain embodiments, the tracking apparatus determines location data and movement data of the participant and the object using triangulation of signals that are one or the combination of (i) emitted from and (ii) received by an object location unit and a participant location unit; the object location unit and the participant location unit attached to the object and to the participant, respectively; the signals selected from the group consisting of sound, radio waves, microwaves, ultraviolet light, visible light, infrared light, and any combinations thereof.

In certain embodiments, the tracking apparatus determines location data and movement data of the participant and the object using light field data captured by one or the combination of (i) the tracking apparatus and (ii) the object location unit and the participant location unit.

In certain embodiments, the machine-readable instructions, when processed by the server, are further capable of: determining, based on viewing directives received from the spectator, a virtual camera defining an origin within the three-dimensional model and a direction of the free-viewpoint experience; and generating the virtual image having a portion of the three-dimensional model, based upon the virtual camera.

In certain embodiments, the output is the virtual image.

In certain embodiments, the output is the three-dimensional model.

Certain embodiments further include a software module, having machine readable instructions, that when executed by a processor of the viewing device is capable of: determining, based on viewing directives received from the spectator, a virtual camera defining an origin within the three-dimensional model and a direction of the free-viewpoint experience; and generating the virtual image having a portion of the three-dimensional model, based upon the virtual camera.

In certain embodiments, the machine-readable instructions, when processed by the server, are further capable of: determining, within the three-dimensional model, around each of the participant and the object, a virtual grid having a plurality of cells; and mapping at least a portion of one of the primary images identified by at least one cell of the virtual grid corresponding to the participant or object.

In certain embodiments, the machine-readable instructions, when processed by the server, are further capable of: correcting the virtual image based on at least a portion of one of the primary images identified by at least one cell of a secondary grid corresponding to the participant or object; the secondary grid positioned between the virtual camera and the participant or object.

In certain embodiments, the software module is further capable of correcting the virtual image based on at least a portion of one of the primary images identified by at least one cell of a secondary grid corresponding to the participant or object; the secondary grid positioned between the virtual camera and the participant or object.

In certain embodiments, the secondary grid is a virtual secondary grid.

In certain embodiments, the machine-readable instructions are further capable of: interpolating between any two of the primary images.

In certain embodiments, the software module is further capable of interpolating between any two of the primary images.

In certain embodiments, the machine-readable instructions, when processed by the server, are further capable of: determining, based on the three-dimensional model and the virtual camera, when an obstruction is located between (i) the virtual camera and (ii) the object or the participant; and sending directives to the software module to display at least a portion of the virtual image corresponding to the obstruction.

In certain embodiments, the software module is further capable of removing an obstruction from the virtual image, the obstruction located between the virtual camera and the participant or object within the virtual image.

In certain embodiments, the machine-readable instructions, when processed by the server, are further capable of determining an occurrence of interest based on the three-dimensional model and the virtual camera; the occurrence having at least an identity and coordinates relative to the three-dimensional model.

In certain embodiments, the machine-readable instructions, when processed by the server, are further capable of sending directives to the software module to provide visual special effects and audible special effects, within the free-viewpoint experience, based on the three-dimensional model, virtual camera, and occurrence of interest.

In certain embodiments, the machine-readable instructions, when processed by the server, are further capable of adding, to the virtual image, visual special effects and audible special effects based on the three-dimensional model, virtual camera, and occurrence of interest.

In certain embodiments, the software module is further capable of determining an occurrence of interest based on the three-dimensional model and the virtual camera; the occurrence having at least an identity and coordinates relative to the three-dimensional model.

In certain embodiments, the software module is further capable of providing visual special effects and audible special effects, within the free-viewpoint experience, based on the three-dimensional model, virtual camera, and occurrence of interest.

In certain embodiments, the machine-readable instructions, when processed by the server, are further capable of: receiving sound feeds from a plurality of microphones positioned at the event area; and mapping the sound feeds to the three-dimensional model.

In certain embodiments, the output, of the server, further includes sounds based on the three-dimensional model and the virtual camera.

In certain embodiments, the software module is further capable of providing sounds, within the free-viewpoint experience, based on the three-dimensional model and the virtual camera.

In certain embodiments, the software module is further capable of providing haptic feedback, within the free-viewpoint experience, based on the virtual camera and the occurrence of interest.

BRIEF DESCRIPTION OF THE FIGURES

FIG. 12A-12C show a portion of the event arena of FIG. 1 having a surrounding border forming a secondary grid, in an embodiment.

DETAILED DESCRIPTION

Conventionally, a spectator of an event has a view that is limited in perspective either because of a location of the spectator relative to the action in the event, or by the location of cameras capturing images of the event. Systems and associated methods disclosed herein create an enhanced viewing experience for a spectator that includes one or more of augmented reality, mixed reality, extended reality, and virtual reality. These viewing experiences may be uniquely created by the spectator and shared socially.

Figure 1:
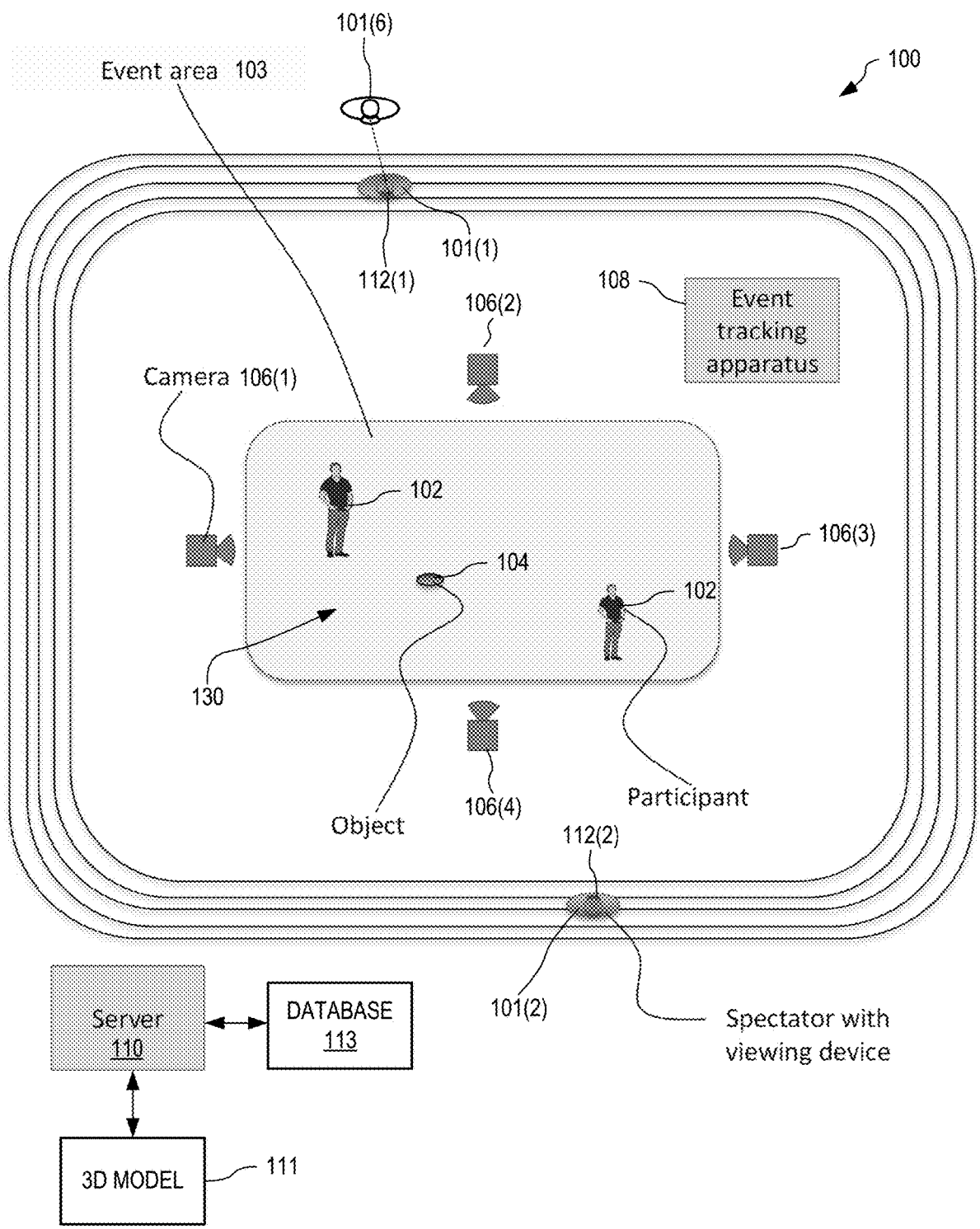
FIG. 1 is a schematic diagram illustrating one example system for creating a viewing experience, according to an embodiment.
Figure 2:
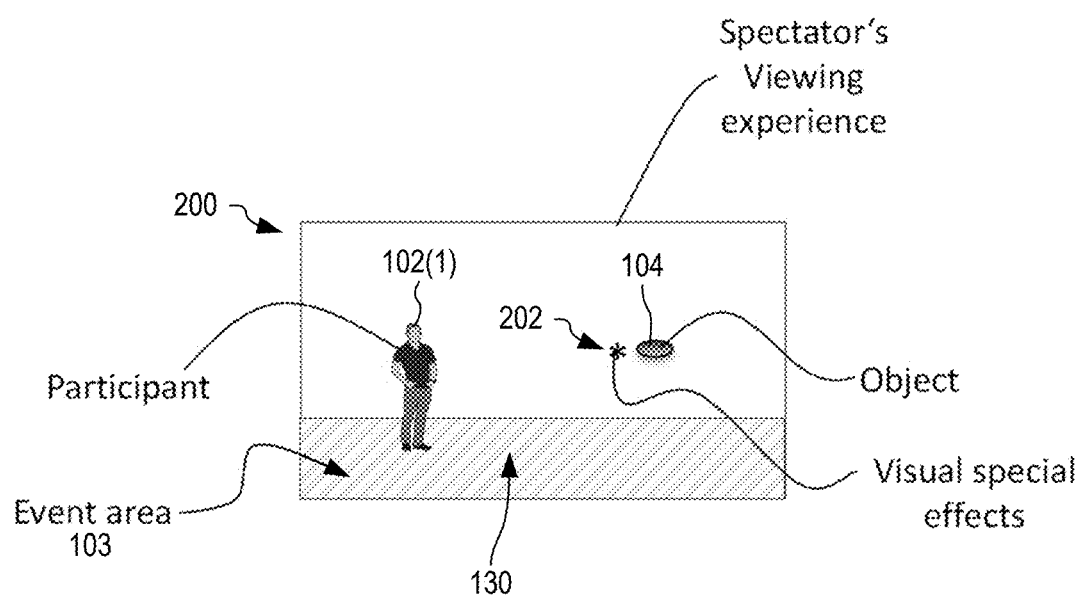
FIG. 2 illustrates one example viewing experience created by the system of FIG. 1, according to an embodiment.

FIG. 1 is a schematic diagram illustrating one example system 100 for creating a viewing experience. FIG. 2 illustrates an example viewing experience 200 generated by system 100 of FIG. 1. FIGS. 1 and 2 are best viewed together with the following description. System 100 includes a plurality of cameras 106, an event tracking apparatus 108, and a server 110. Event tracking apparatus 108 tracks the position (location, orientation, movements, etc.) of participants 102 and objects 104 (e.g., a ball, player equipment, and so on) within an event area 103. Event area 103 is any area that may be tracked by system 100, such as a soccer field where the event is a soccer game, an American football field where the event is American football, an ice rink where the event is an ice hockey game, a stage where the event is a concert, and office where the event is a conference, and so on.

Cameras 106(1)-(4) are positioned around, above and within event area 103 to capture live images of an event within event area 103. Captured images may be streamed to server 110 as image feeds (see, e.g., image feeds F1-F4 FIG. 3) and stored in a database 113. Although shown with four cameras 106, system 100 may include more of fewer cameras without departing from the scope hereof. One or more of cameras 106 may be configured to capture infrared images, or images using other wavelengths, without departing from the scope hereof.

Tracking information, which may include occurrences of interest, sensor data, and other information, is also sent from the event tracking apparatus 108 to server 110 (e.g., see feed F5, FIG. 3) where it may be stored together with information of image feeds F1-F4 in database 113. Although shown separate from server 110, in certain embodiments, database 113 may be part of server 110. Tracked events, or portions thereof, may be given a unique identifier (also referred to as a "Tag"), that is tracked within database 113, and/or provided via an external BlockChain ledger for example, to allow the event (or portion thereof) to be referenced by internal and external systems. For example, spectators 101 may trade access records (tags) identifying the specific events, or portions thereof, that they have watched. Such tags may allow other spectators to replay these identified events, or portions thereof, based upon the tag.

Server 110 uses information stored within database 113 to replay content of recorded events, or portions thereof; server 110 generates a three-dimensional model 111 (FIG. 3) of corresponding data in database 113 for this replay. Advantageously, this replay of events allows spectator 101 to review actions and events from different viewpoints at a later time, as compared to the viewpoint he or she had when watching the event live, for example.

When replaying an event from database 113, spectator 101 may adjust timing of replayed action. For example, when watching a scene with several participants 102, spectator 101 may adjust replay speed of one of the participants such that scene dynamics are changed. For example, a trainer may use replay of a captured scenario and change the speed of different participants to illustrate possible results that might have occurred had one of the participants moved 20% slower or faster. Such adjustment of replay timing to see alternative results may for example be implemented through telestration with a vision cone.

In one embodiment, event tracking apparatus 108 determines location data and movement data of each participant 102 and/or each object 104 within the event area 103 using triangulation. For example, event tracking apparatus 108 may include three or more receivers positioned around the event area 103 to receive signals from one or more location units (see location unit 1002 of FIG. 10) positioned on each participant 102 and/or object 104. Accordingly, event tracking apparatus 108 may determine a location of each participant 102 and/or object 104 based upon signals received from the location units. The signals used for triangulation may for example be sound, radio waves, microwaves, ultraviolet light, visible light, infrared light, or any combinations thereof. In one example, the location units on object 104 and/or participant 102 each include transponders emitting radio wave signals that are triangulated to determine location by event tracking apparatus 108.

Alternatively, in an embodiment, each of the location units may periodically and/or aperiodically determine and report its location to the event tracking apparatus 108. In this embodiment, the location units separately includes capability (for example triangulation is determined on board based on fixed transponders around event area 103) to determine and repetitively report a unique position. Depending on the event, when slower update rates are requested, such location units may even employ GPS Event tracking apparatus 108 may also receive sensor data from location devices (e.g., location devices 1002) attached to each of the participants 102 and/or objects 104. For example, the location devices may include one or more sensors (e.g., accelerometers) that detect movement of participants 102 and/or objects 104. Location devices may be positioned on the participants 102 and/or objects 104 to detect particular movement. For example, a head mounted location device may detect head movement of participant 102, a hand mounted location device may detect hand movement of participant 102, and so on. These physical sensors may also be configured to detect specific posture moves of participant 102, such as reaching, squatting, laying, bending, and so on. Advantageously, server 110 may thus determine the location, orientation, and posture of participants 102, based on the location devices, such that three-dimensional model 111 accurately portrays the event within event area 103. In particular, event tracking apparatus 108 may send this information to server 110 to generate, in real-time, a three-dimensional model 111 of the event area 103, along with the participants 102 and the objects 104.

Server 110 may also use images from the cameras 106 (1)-(4) to enhance three-dimensional model 111, as described in detail below. For example, cameras 106 may be positioned around, within, and above event area 103 to capture primary images of the event occurring within event area 103.

In embodiments, and such as shown in FIGS. 3,4,5,6,7,8, system 100 generates the viewing experience 200 on a viewing device 112 for each spectator 101 of an event in real time (i.e., live). The viewing experience 200 may be based upon one or more of augmented, mixed, virtual reality, and extended reality, and may include visual and/or audible special effects 202 (FIG. 2) that are generated by system 100, to enhance the viewing experience 200 for spectators 101. For example, for a spectator of a soccer match, when the participant 102 (e.g., a soccer player) scores a goal, system 100 may generate viewing experience 200 to include real-time visual and/or audible special effects 202 of a dazzling fireworks display with corresponding sounds.

Figure 3:
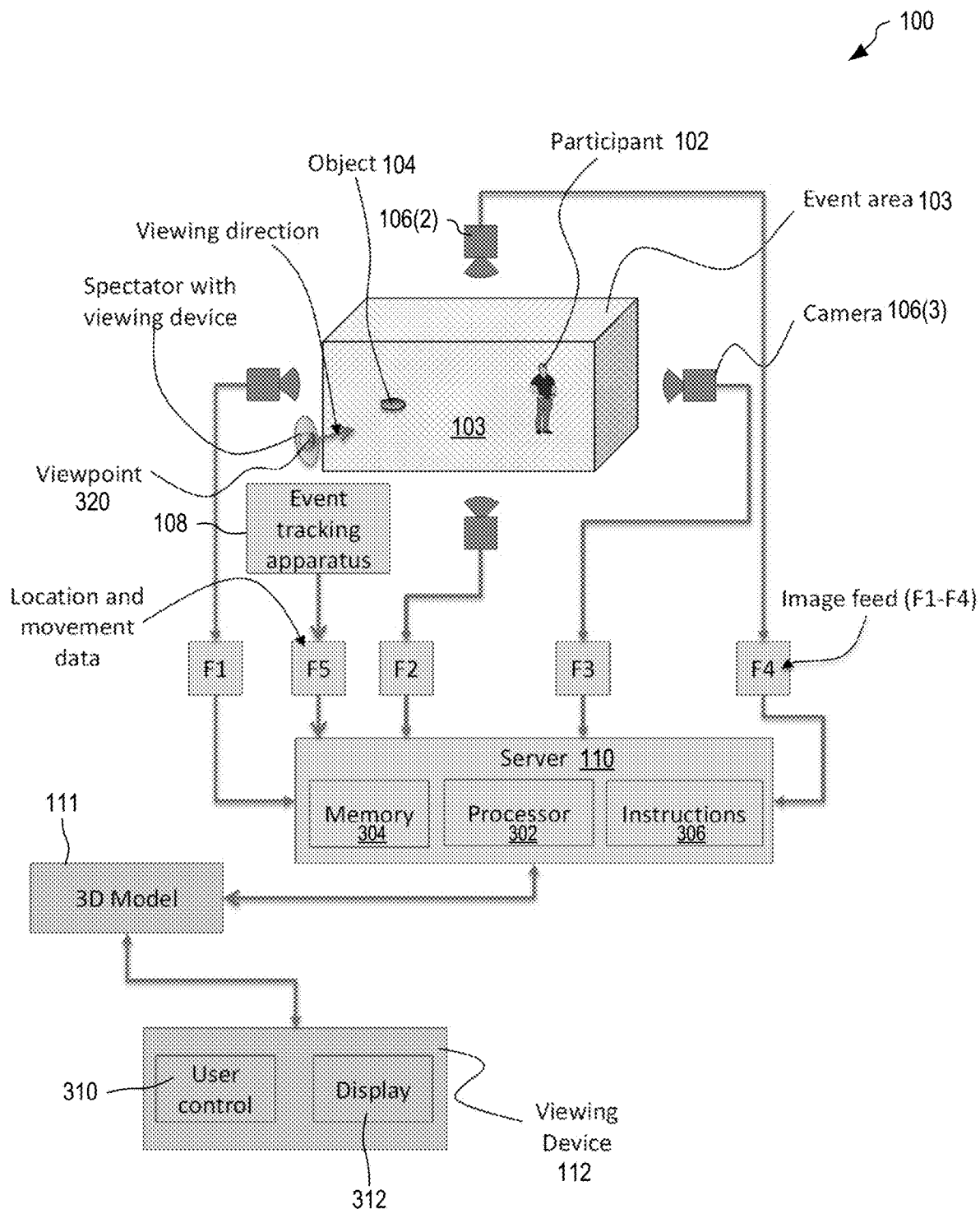
FIG. 3 shows the system of FIG. 1 in further example detail, for creating a viewing experience from a 3D model based upon a spectator controlled viewpoint, according to an embodiment.
Figure 4:
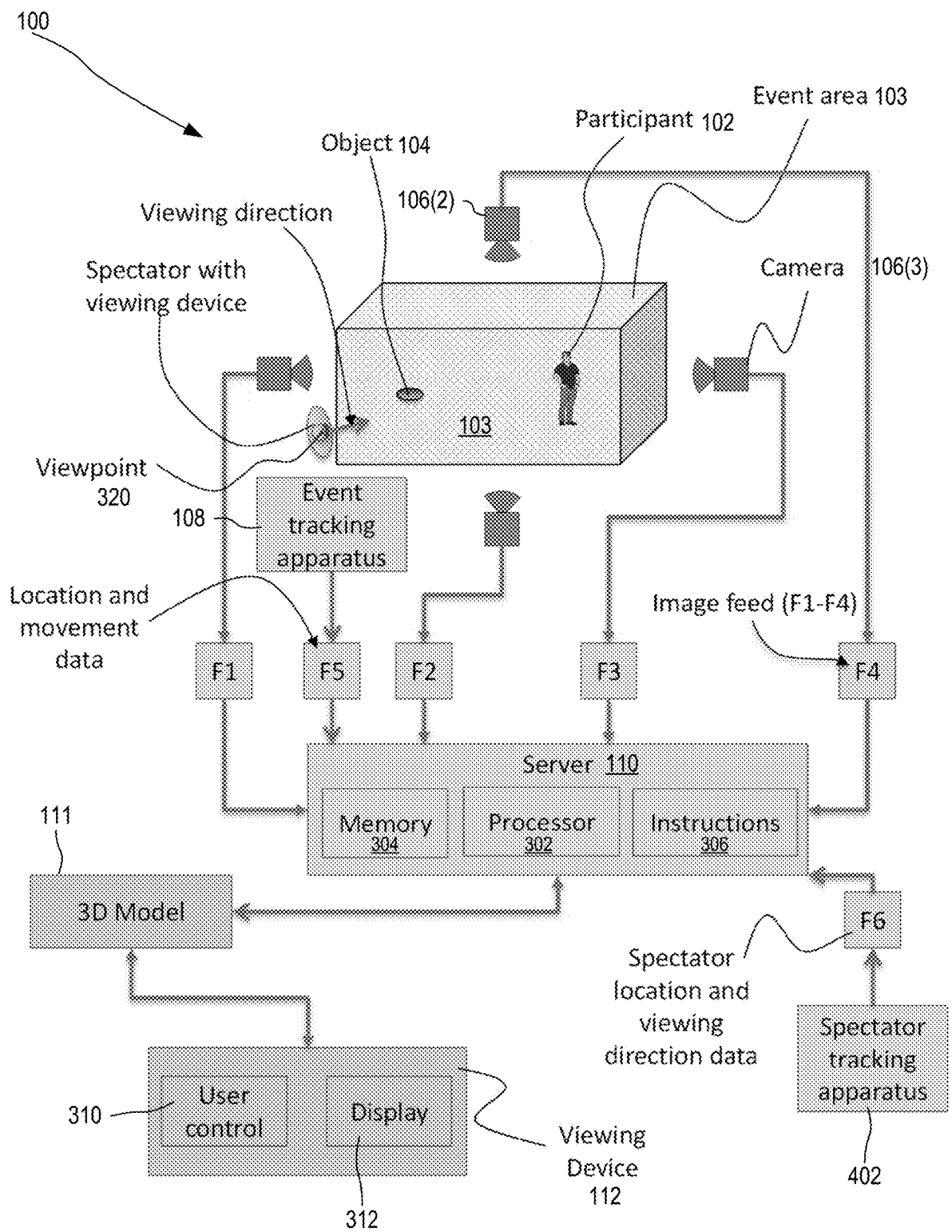
FIG. 4 shows the system of FIG. 3 further including a spectator tracking apparatus, according to an embodiment.
Figure 5:
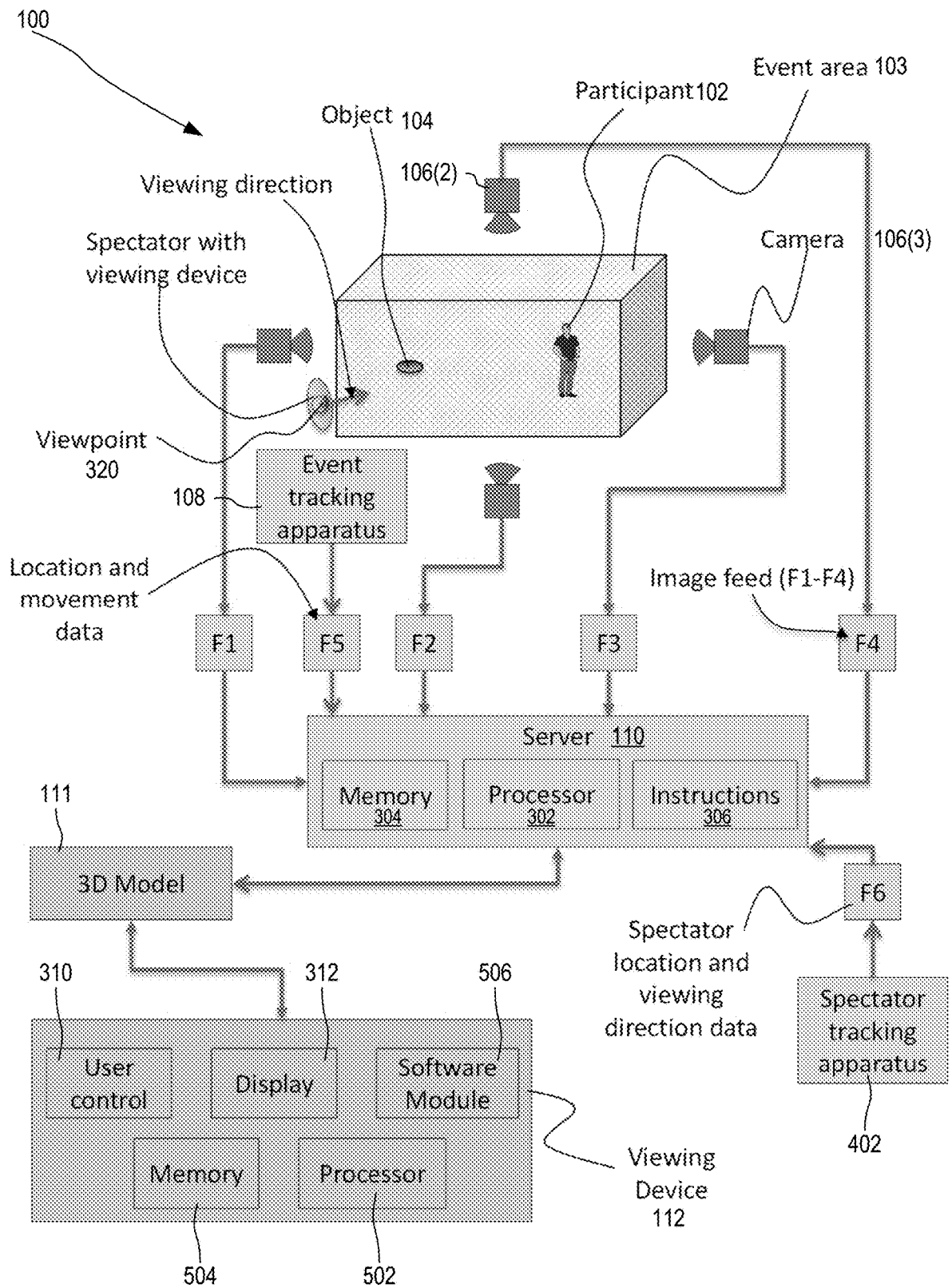
FIG. 5 shows the viewing device of FIGS. 3 and 4 in further example detail, according to an embodiment.

In certain embodiments, such as shown in FIG. 3-5, system 100 generates viewing experience 200 for spectator 101(1) based upon a viewpoint 320 that is freely selectable by spectator 101(1) and may resemble a viewpoint captured by a virtual camera (see FIG. 6,9) that is virtually positioned anywhere by the spectator 101(1). Continuing with the soccer example, spectator 101(1) may for example position the virtual camera 606 near the soccer player or view towards the goal as the soccer player kicks the ball, thereby having a previously unobtainable viewpoint 320 of live action.

FIG. 3 shows system 100 of FIG. 1 in further example detail. In this embodiment, system 100 creates a viewing experience from a 3D model based upon a spectator viewpoint 320 that may be controlled by the spectator 101. Server 110 includes at least one processor 302 and memory 304 storing machine-readable instructions 306 that, when executed by the processor 302, control the at least one processor 302 to generate three-dimensional model 111 of the event area 103, participants 102 and objects 104 based upon the location data and movement data captured by the event tracking apparatus 108. Instructions 306 may also control the at least one processor 302 to determine spectator viewpoint 320 based on the spectator location data and spectator viewing direction data. For example, the spectator viewpoint 320 may define a location of spectator 101, relative to the three-dimensional model 111, and a direction of view of the spectator 101 such that the server 110 then generates viewing experience 200 from the three-dimensional model 111 based upon the spectator viewpoint. Location units 1002 may be placed with spectator 101 to determine location of spectator 101; or cameras 106 may be used to determine location of spectator 101; or viewing device 112 may have its own location capability to determine spectator location, for example. In certain embodiments, the viewing device 112 includes user controls 310 that allow spectator 101 to control the spectator viewpoint 320, and thereby the spectator viewing experience 200 displayed on a display 312 of viewing device 112. For example, the spectator viewpoint 320 may include spectator coordinate information based upon a grid used by the three-dimensional model 111, wherein the user controls 310 allows spectator 101 to reposition the spectator viewpoint 320 within three-dimensional model 111 such that spectator 101 watches the event from other desired perspectives.

Figure 6:
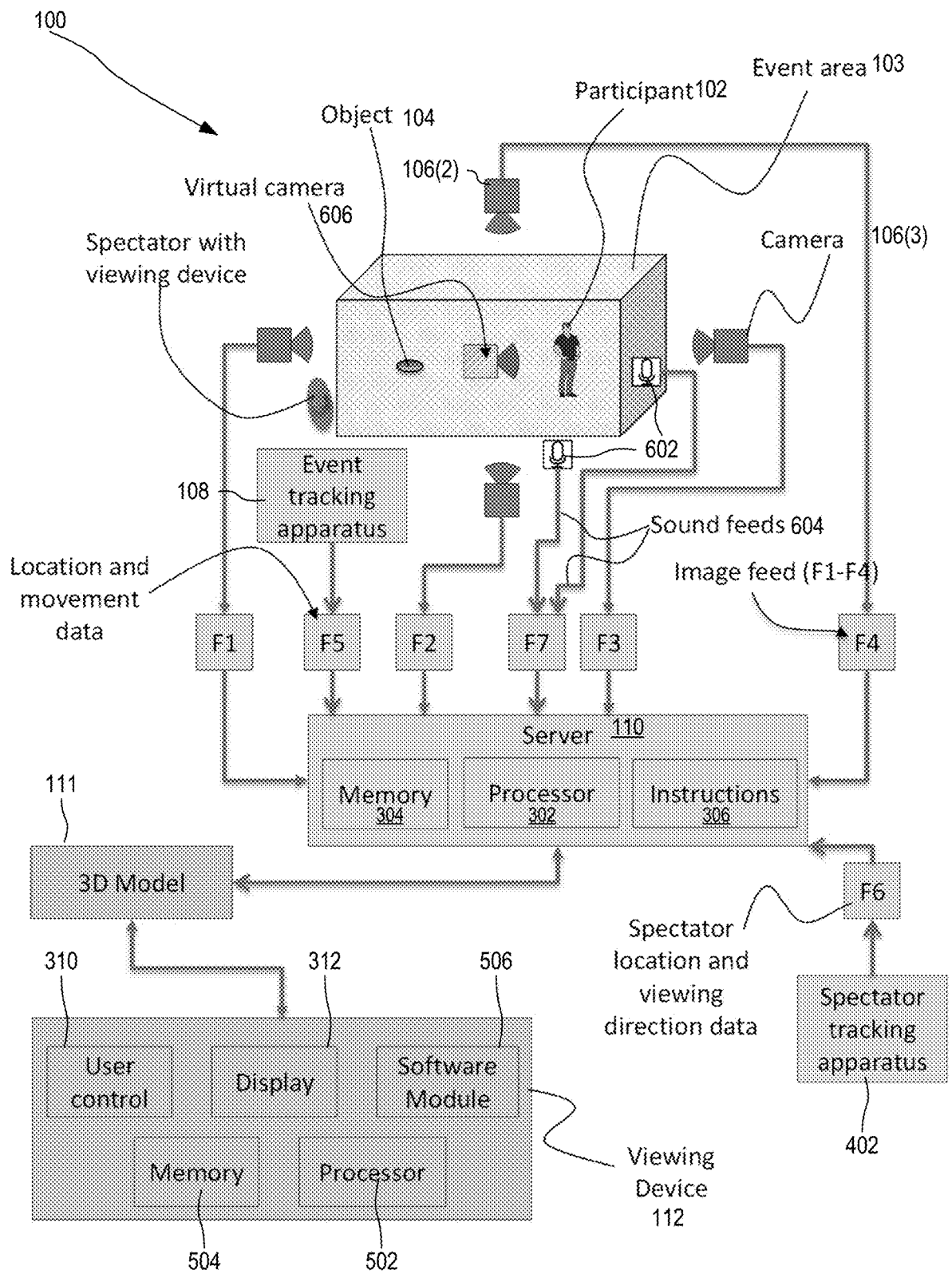
FIG. 6 shows the system of FIG. 5 further including at least one microphone and illustrating a virtual camera, according to an embodiment.
Figure 7:
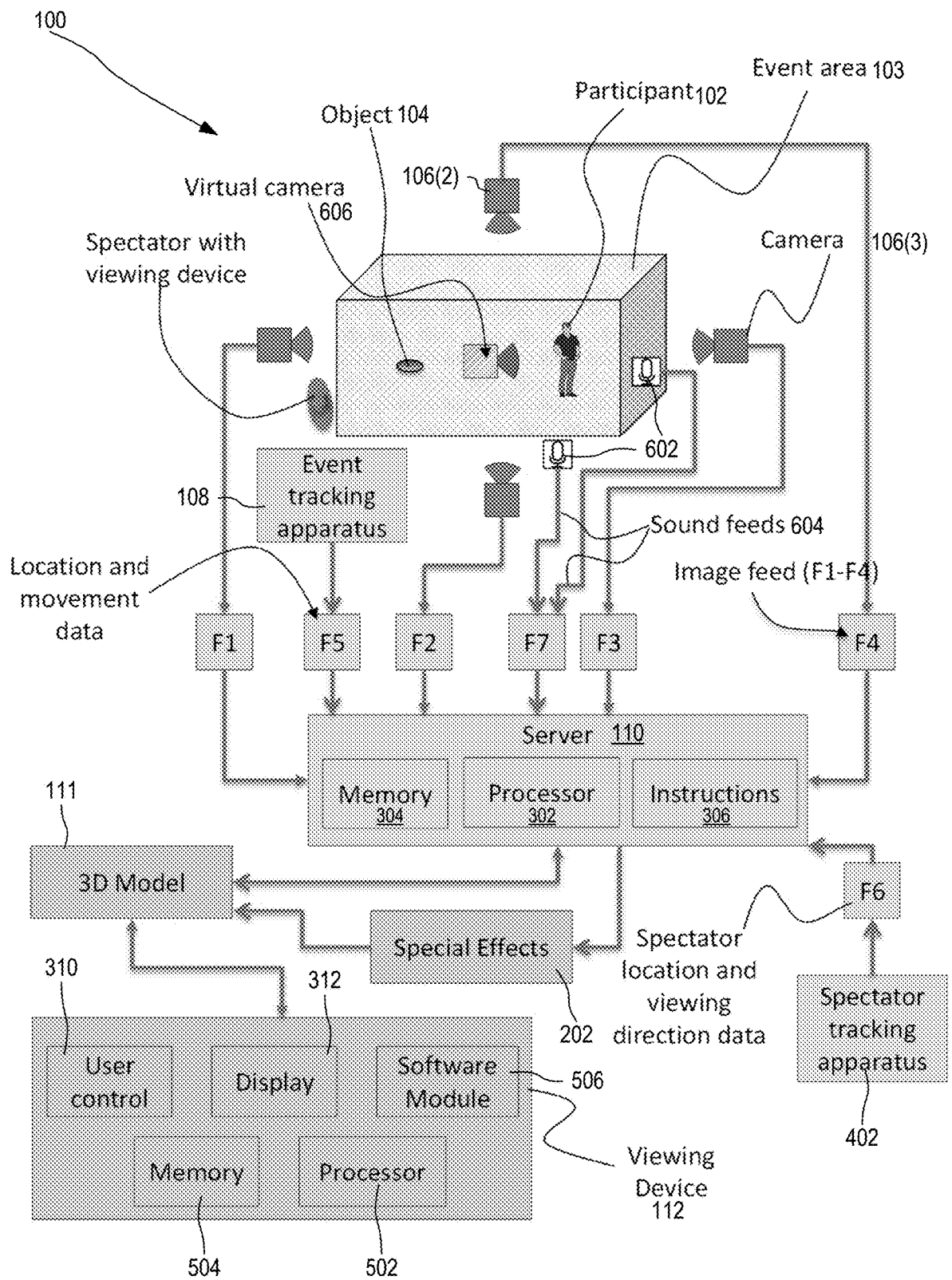
FIG. 7 shows the system of FIG. 6 further illustrating generation of special effects to enhance the viewing experience, according to an embodiment.

In certain embodiments, instructions 306, when executed by processor 302, control processor 302 to implement artificial intelligence to estimate images needed to complete viewing experience 200, by learning how to provide data that might be missing from feeds F1-F7 (see, e.g., FIGS. 6,7). Accordingly, system 100 may learn to store portions of images and information that may be used to correct and/or complete three-dimensional model 111 under certain conditions when such information may be missing from feeds F1-F7. For example, based upon positioning of cameras 106 and/or obstruction of one participant 102 by another or building structure, if image feeds F1-F5 (FIGS. 3,4,5) do not include certain portions of participant 102 or object 104, system 100 may use images and/or data from database 113 to complete three-dimensional model 111 so that the spectator can replay the event without obstruction.

FIG. 4 shows the system of FIG. 3 further including a spectator tracking apparatus 402 that may be configured to determine spectator location data and spectator viewing direction data for each spectator 101, illustratively shown as a spectator location and viewing direction data feed F6 to server 110. As noted above, location for the spectator 101 may be derived in various ways for inclusion in feed F6.

FIG. 5 shows viewing device 112 of FIGS. 3 and 4 in further example detail. In certain embodiments, machine readable instructions 306, when processed by the server 110, are capable of determining an occurrence of interest 130 (e.g., an action, situation, etc., within the event area, as shown in FIGS. 1 and 2) based on the three-dimensional model 111 and the spectator viewpoint 320. The occurrence of interest 130 may have, at least, an identity and coordinates relative to the three-dimensional model 111.

In certain embodiments, viewing device 112 includes a processor 502 and memory 504 storing a software module 506 that, when executed by processor 502, controls processor 502 to augment viewing experience 200 for spectator 101 when instructed by server 110. Viewing device 112 may for example be a screen held by, or positioned in front of, spectator 101 or positioned in front of the spectator, or a device worn by spectator 101, such as a helmet, goggles, glasses, and contact lenses. Viewing device 112 thereby positions viewing experience 200 in front of the spectator's eye(s), projects viewing experience 200 into the spectator's field of vision, or projects viewing experience 200 into the spectator's eye(s). In certain embodiments, viewing device 112 may be a tablet, a computer, or a mobile device (e.g., a smartphone). For example, viewing device 112 may be an Oculus Go™ device, an iPad™, an augmented reality display, and so on. Viewing device 112 may include one or more sensors that sense input, such as movement, noise, location, selection, and so on, by spectator 101. This input may be used to direct spectator viewpoint 320 and/or the virtual camera for example.

FIG. 7 shows the system of FIG. 6 further illustrating generation of special effects to enhance the viewing experience 200, according to an embodiment. In embodiments, server 110 generates visual and/or audible special effects 202 that are added to 3D model 111. Visual and/or audible special effects 202 may be added to three-dimensional model 111 as if they are part of live action, wherein the viewing experience 200 generated from three-dimensional model 111 includes the special effects 202. Visual and/or audible special effects 202 may be included within three-dimensional model 111 as codes and/or instructions that may be sent to viewing device 112 when the corresponding viewpoint 320 includes the visual and/or audible special effects 202.

In embodiments, software module 506 is configured to control processor 502 to augment viewing experience 200 by providing visual and/or audible special effects 202. Visual and/or audible special effects 202 may include, for example, one or more of fireworks, an explosion, and a comet tail and may be associated with images of participants 102, objects 104, or other computer-generated images. Visual and/or audible special effects 202 may also include outlining one or more participants 102 and/or object 104 in viewing experience 200. Visual and/or audible special effects 202 may also include visual manipulation of images of participants 102 and/or objects 104. Visual and/or audible special effects 202 may further include annotating information that provides spectator 101 with additional information on the event within event area 103. In one example, the annotation information may be selected based at least in part upon one or more of the event, occurrence of interest, participant 102, and/or object 104. For example, viewing device 112 may display annotation data that includes scoring statistics of a basketball player during a live match.

Any audible portion of visual and/or audible special effects 202 may correspond to the visual portion of the visual and/or audible special effects 202. For example, the audible portion may include the sound of an explosion corresponding to the visual portion that shows an explosion. But the visual and audible portions of the visual and/or audible special effects 202 may be independent of each other. As shown in FIG. 7, microphones 602 placed at the event area 103 may provide direct audio data as sound feeds 604 collected at feed F7.

Software module 506 may receive visualization data from server 110 such that the software module 506 augments the visual experience 200 by applying the visualizations to the body of participant 102 and/or object 104. The server 110 may apply the visualizations to three-dimensional model 111 such that viewing experience 200 is generated by server 110 with the applied visualizations. These visualizations may for example indicate a status of participant 102 and/or object 104 within the game play, such as one or more of health, power, weapon status, and so on.

Figure 8:
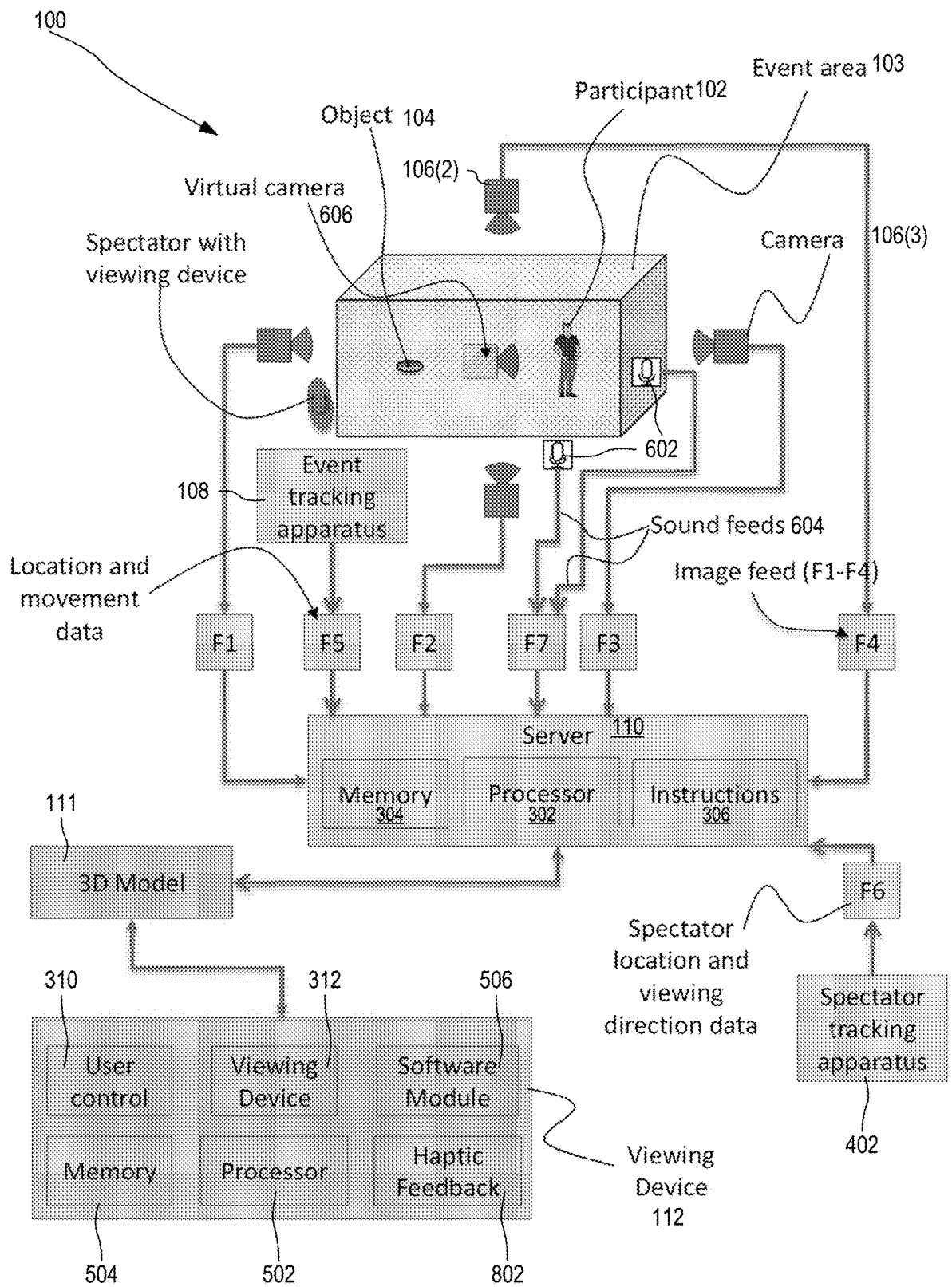
FIG. 8 shows the system of FIG. 7 further illustrating generation of haptic feedback with the viewing experience, according to an embodiment.
Figure 9:
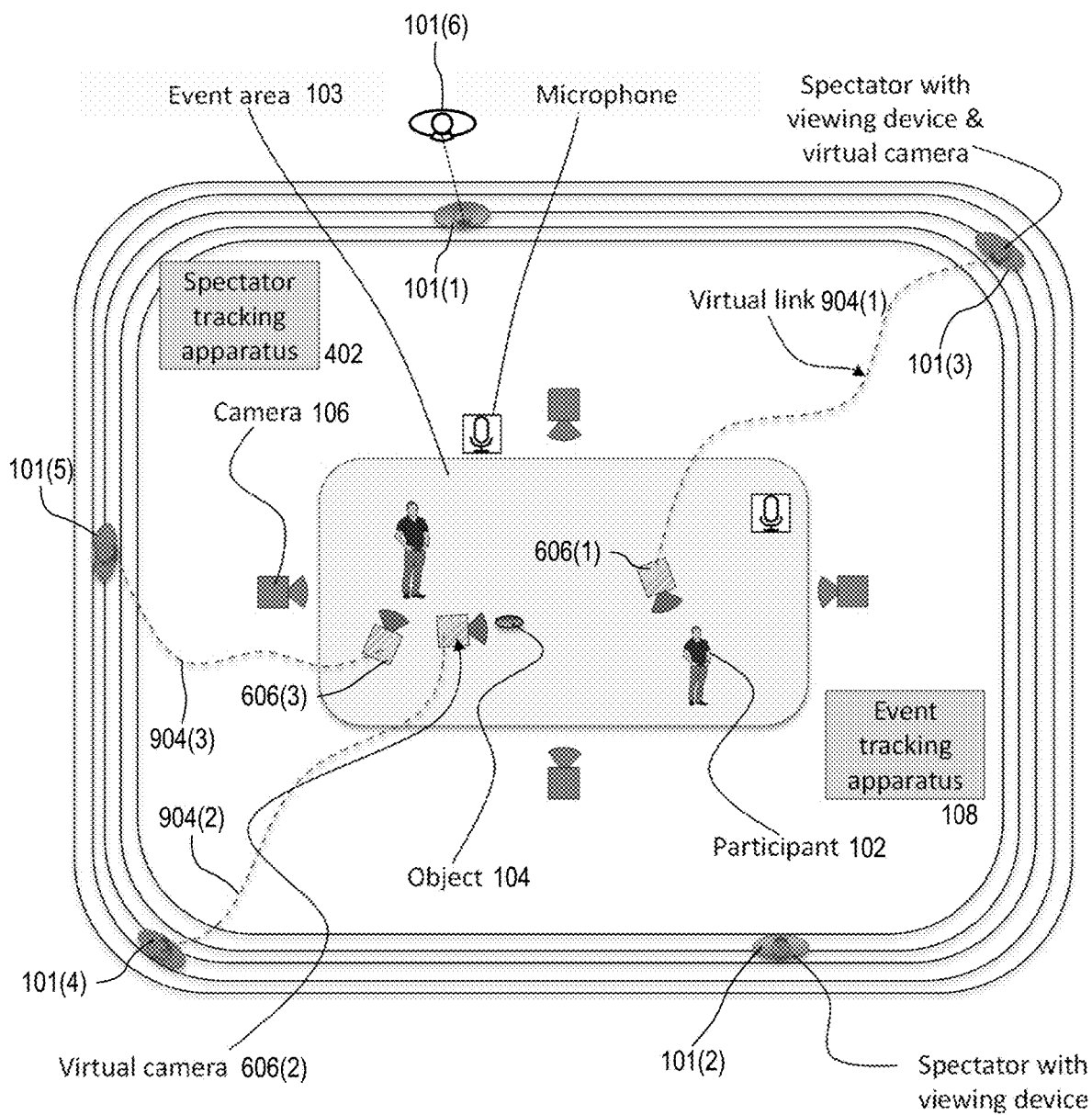
FIG. 9 shows the system of FIGS. 1-8 with a plurality of virtual cameras illustratively shown within the event arena.
Figure 10:
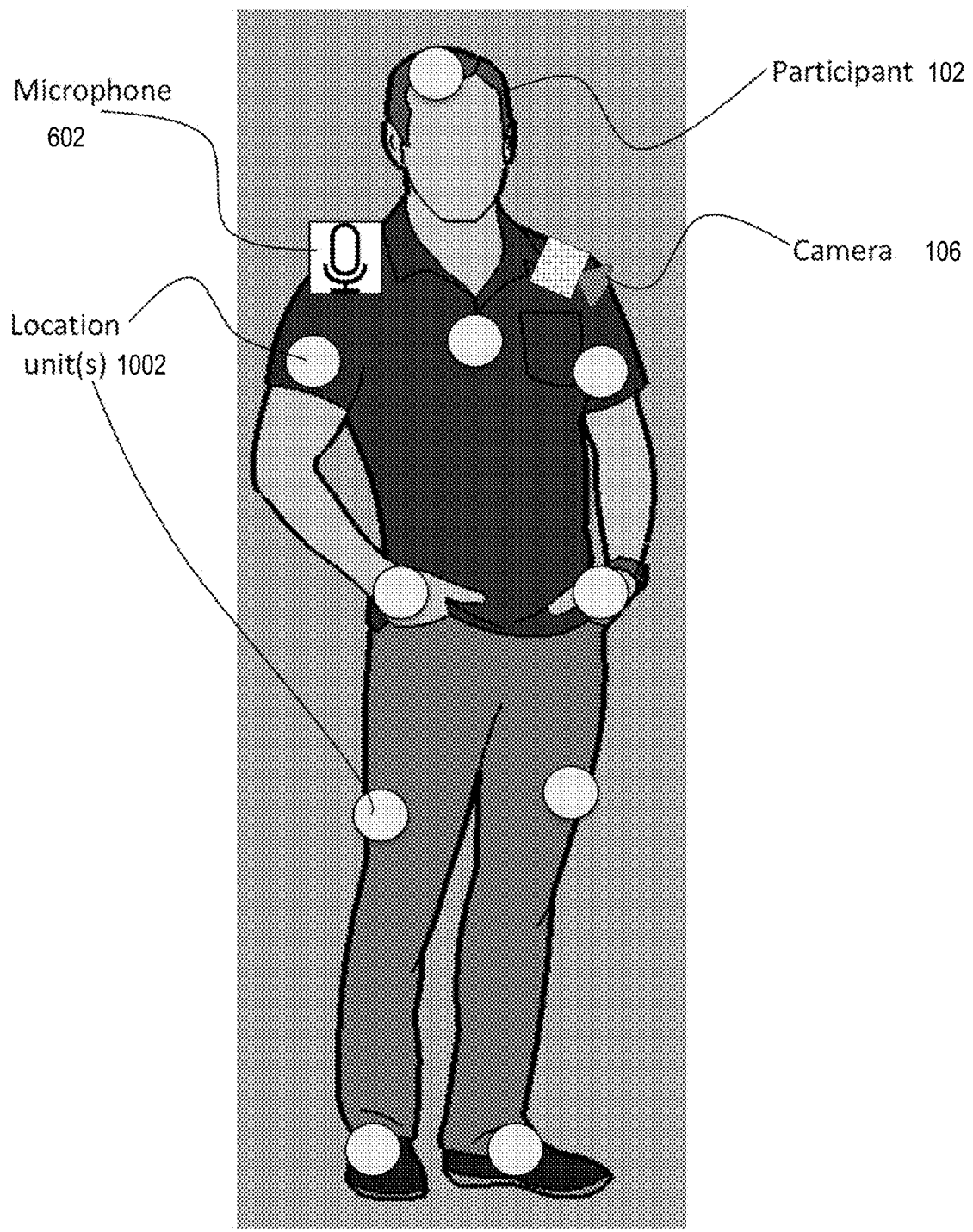
FIG. 10 shows one example participant configured with one of the microphones and one of the cameras of the system of FIGS. 1-9, and further configured with a plurality of participant location units, in an embodiment.

FIG. 10 shows one example participant 102 configured with one of the microphones 602 and one of the cameras 106 of the system of FIGS. 1-9, and further configured with a plurality of participant location units 1002. More than one camera 106 and more than one microphone 602 may be affixed to the participant 102 without departing from the scope hereof. Similarly, one (or a plurality of) cameras 106 may be affixed to one or more objects 104. When attached to participants 102 and/or objects 104 that move, event tracking apparatus 108 may also track location and movement of the attached camera 106 and/or microphone 602. In certain embodiments, participant 102 wears a suit that is configured with a combination of location units 1002, cameras 106, microphones 602, and other sensors (e.g., biometric sensors) that provide data to server 110. One or more these sensors may be inside the body or attached to the body of participant 102.

In certain embodiments, the event tracking apparatus 108 and/or the spectator tracking apparatus 402 may be integrated, at least in part, with server 110, such that event tracking apparatus 108 and/or the spectator tracking apparatus 402 is integrated with server 110. Event tracking apparatus 108 and/or spectator tracking apparatus 402 may instead be a computer based server (like server 110) that includes a processor and memory storing instructions that control the server to use sensor data to track location of the participants 102, objects 104 and/or spectators 101. These servers, and server 110, may be a video processing server, for example.

As noted earlier, event area 103 may be a sporting arena, a stage, an outdoor field, a street, or a room, for example. The event occurring within event area 103 may thus be a sporting event, a concert, a play, an opera, a march, or other event (such as a conference in a conference room) that may have spectators 101. Regardless, system 100 provides multiple viewing experiences 200 to the spectators 101.

Instructions 306, when executed by processor 302, may control processor 302 to generate three-dimensional model 111 based upon event area 103, wherein three-dimensional model 111 may represent physical construction of event area 103. However, three-dimensional model 111 may alternatively have a representation that differs from event area 103. For example, three-dimensional model 111 may be generated to represent certain structure that is not present within the actual event area 103, and is therefore unrelated to physical structure at event area 103. Accordingly, three-dimensional model 111 may in part be generated from images and data stored within a database (e.g., database 113) that define structure unconnected with event area 103. Three-dimensional model 111 may for example represent multiple adjoining event areas whereas the actual event area 103 does not physically adjoin these other event areas represented within three-dimensional model 111. In certain embodiments, where viewing experience 200 is generated as virtual reality, representation of event area 103 by three-dimensional model 111 may be selected by one or more of spectator 101, participant 102, and/or crowd-sourced selection (e.g., multiple spectators 101). For example, spectator 101 may control three-dimensional model 111 to represent event area 103 as a mountain top, even though the actual event area 103 is a room. In another example, when event area 103 is a stage and spectator 101 is watching a concert, spectator 101 may change the representation of the stage to be on a mountain top, wherein the participants 102 and objects 104 (e.g., performers and instruments) are shown within viewing experience 200 and being on the mountain top.

Server 110 may provide multiple functions. For example, in FIGS. 3-9, event tracking apparatus 108 may provide location and movement data (shown as data stream F5) to server 110, while the plurality of cameras 106 may also provide images (shown as image streams F1-F4) to server 110. In addition, consider FIG. 10, which shows a plurality of location units 1002 positioned on one participant 102; these location units 1002 may also be positioned on, or configured, with objects 104. Tracking of objects 104 and/or participants 102 may further include multiple input, multiple output (MIMO) protocols understood by server 110. Event tracking apparatus 108 may for example use image analysis to identify a location of, and a position of, participant 102 and/or object 104. Event tracking apparatus 108 may use images captured by at least two cameras 106 at event area 103 to triangulate location of participants 102 and/or objects 104. The location units 1002 may include reflective and/or emissive visual markers that may be detected within the images captured by cameras 106.

Event tracking apparatus 108 may alternatively determine location data and movement data of participants 102 and/or objects 104 using light field data captured by one or more of (i) event tracking apparatus 108 (e.g., using cameras 106 and/or other cameras) and (ii) location units 1002 at the object 104 and/or the participant 102. In these embodiments, event tracking apparatus 108 may include or be connected to one or more light-field cameras positioned to capture light-field data of the event area 103. The light-field data may include one or more of light intensity, light direction, and light color.

In certain embodiments, spectator tracking apparatus 402 may include components, features, and functionality similar to event tracking apparatus 108 to track location and/or viewing direction of each spectator 101. Spectator tracking apparatus 402 may determine spectator location data and spectator viewing direction data using triangulation of signals that are one or the combination of (i) emitted from and (ii) received by a spectator location unit (similar to the location unit 1002). The signals may for example be sound, radio waves, microwaves, ultraviolet light, visible light, infrared light, and combinations thereof. Alternatively, the spectator tracking apparatus 402 may determine spectator location data and spectator viewing direction data using light field data captured by one or the combination of (i) the spectator tracking apparatus and (ii) the spectator location unit 1002. Spectator location and viewing direction may also be determined by image analysis of images captured by a camera on the viewing device 112 used by the spectator 101. Spectator location and viewing direction may be determined through image analysis of images captured by multiple viewing devices 112, each from a different spectator 101. For example, FIGS. 4-8 illustrate spectator tracking apparatus 402 providing information of spectator viewpoint 320 to server 110 as feed F6. In certain embodiments, event tracking apparatus 108 includes functionality to track spectators 101 and generate spectator location and viewing direction via data feed F6; and in this case spectator tracking apparatus 402 is not even used and yet system 100 retains all functionality.

Sharing of viewing experiences may be accomplished in several ways. For example, as shown in FIGS. 1 and 9, spectator 101(1) may share viewing experience 200 with another spectator 101(6). In another example, a celebrity (e.g., famous player, movie star, etc.) may create and share viewing experience 200 with other spectators 101 (followers). In yet another example, as a participant 102 at a conference, spectator 101(1) may share viewing experience 200 with many other spectators 101 not at the conference.

Figures 11A, 11B:
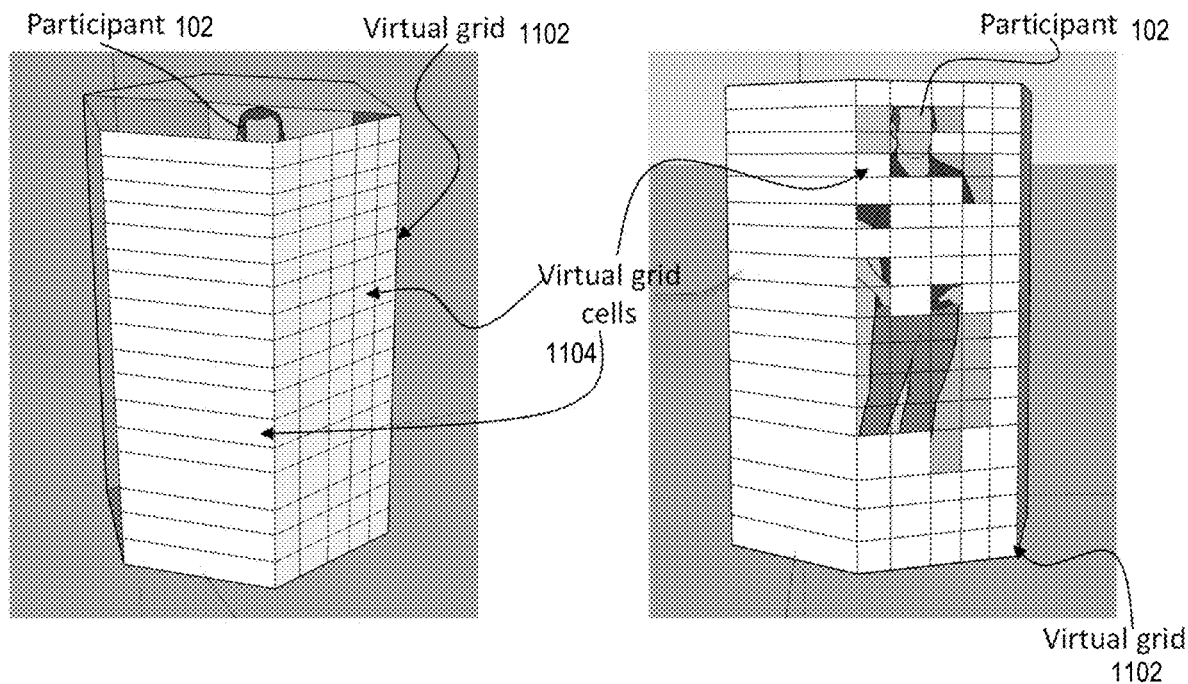
FIGS. 11A-11C depict a virtual grid around a participant, in an embodiment.
Figure 11C:
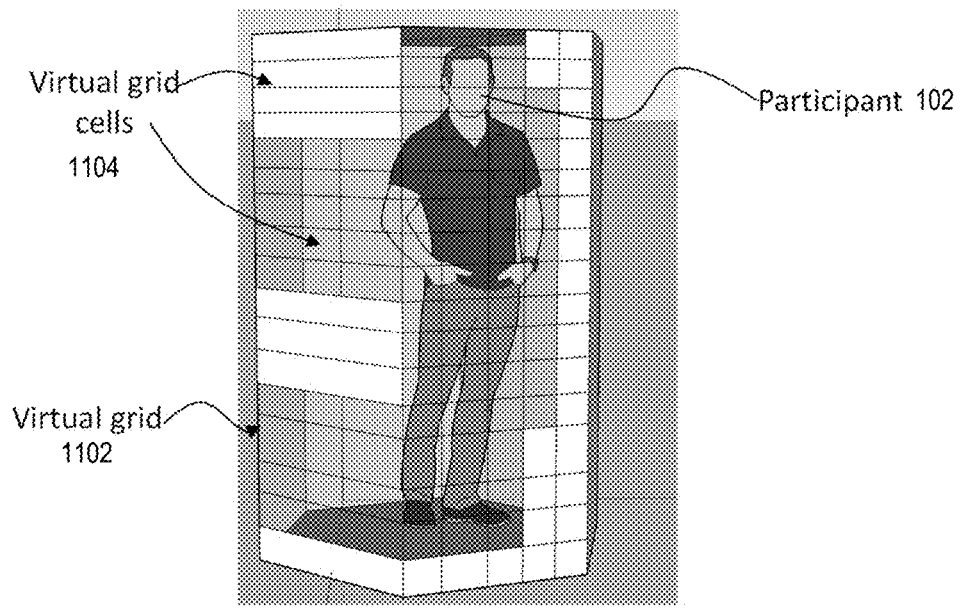

In certain embodiments, and with reference to FIGS. 11A-11C, machine readable instructions 306, when executed by processor 302, control processor 302 to: (a) receive the primary images (e.g., image feeds F1-F4 in the example of FIGS. 3-8) from the plurality of cameras 106; (b) generate, within three-dimensional model 111, a virtual grid formed of a plurality of cells around each participant 102 and object 104; (c) map at least a portion of one of the primary images (e.g., from feeds F1-F4) identified by at least one cell 1104 of the virtual grid 1102 corresponding to the participant 102 or object 104 to the three-dimensional model 111; and (d) generate a virtual image having a portion of the three-dimensional model 111 corresponding to participant 102 and/or object 104 based at least in part upon spectator viewpoint 320. Virtual grid 1102 may be used to enhance three-dimensional model 111 and/or viewing experience 200 that is based on the three-dimensional model 111 by more accurately, and with higher resolution, rendering images of participant 102 and/or object 104. In certain embodiments, virtual grid 1102 has a longitudinal direction and appears multi-sided when viewed in the longitudinal direction. For example, virtual grid 1102 may be hexagonal in shape when viewed in the longitudinal direction, as illustrated in FIGS. 11A-11C. FIGS. 11A-11C further illustrate mapping of portions of primary images (e.g., from image feeds F1-F4) to cells 1104 of virtual grid 1102. In particular, FIG. 11A illustrates virtual grid 1102 around participant 102 with no mapping and FIGS. 11B and 11C show different amounts of virtual grid cells 1104 mapped with portions of primary images from image feeds F1-F4. As shown in FIG. 11C, virtual grid cells that do not correspond to a portion of participant 102 may be unmapped, for example to save processing time. In certain embodiments, cell 1104 may correspond to a real-world dimension of between one and ten centimeters.

Continuing with FIG. 12A, 12B, 12C, instructions 306, when executed by processor 302, may control processor 302 to generate a virtual image based at least in part upon the primary images (e.g., from feeds F1-F4) identified by at least one cell 1104 (FIG. 11A-C) or portion of a secondary grid 1202 corresponding to participant 102 or object 104. As shown in FIG. 12A-C, secondary grid 1202 may be positioned between spectator 101 and participant 102 and/or object 104.

Rendering and Bokeh

When system 100 generates viewing experience 200 in real-time based upon image feeds F1-F4, location and movement data feed F5, spectator location and viewing direction data feed F6, and sound feeds F7, latency of system 100 is low to maintain integrity of viewing experience 200, particularly where viewing experience 200 shows augmented reality or extended reality. Accordingly, the amount of processing required to generate viewing experience 200 may be reduced by determining spectator viewpoint 320 based upon a location of spectator 101 relative to event area 103 and by providing only the information needed to viewing device 112 to generate viewing experience 200. For example, although three-dimensional model 111 is an event area 103, spectator viewpoint 320 may not include all of event area 103, and thus only part of three-dimensional model 111 may actually be used to generate viewing experience 200. As described below, the use of secondary grid 1202 may further reduce processing necessary to generate viewing experience 200, by identifying cells 1104 of virtual grid 1102 that are needed to generate viewing experience 200; cells that are not needed do not require intensive image processing, thereby reducing latency in system 100.

Latency may be further reduced by implementing bokeh within one or both of instructions 306 of server 110 and software module 506 of viewing device 112. Bokeh causes blurring of less important portions of an image (e.g., background and/or foreground), which reduces the required resolution for those portions of viewing experience 200. Accordingly, fewer pixels need be rendered to generate viewing experience 200 based upon three-dimensional model 111, thereby reducing latency of system 100. Bokeh may also highlight the portion of interest (e.g., occurrence of interest 130) to the user within viewing experience 200 since this portion appears in more detail and attracts the attention of the eye of spectator 101, whereas the blurred foreground/background has reduced detail that does not attract the eye's attention.

Secondary grid 1202 may be a physical grid such as a net, a windshield, or border (collectively referred to as border 1206) positioned around event area 103 as shown in FIG. 12A. For example, event area 103 may have an upright border that contains a grid, and which may be visible to the human eye. In another example, the grid may be undetectable to the human eye but may be detected by features (e.g., sensors) of viewing device 112, such as a camera of viewing device 112, wherein the border 1206 may allow viewing device 112 to determine its orientation and/or location relative to event area 103. In certain embodiments, the border grid may comprise features and/or components capable of emitting, reflecting, or detecting visible light, infrared light, ultraviolet light, microwaves, and/or radio waves. In another example, secondary grid 1202 may be worn by the spectator 101 over the spectator's eye(s) and/or integrated with viewing device 112 such that the secondary grid 1202 appears within the spectator's viewpoint (e.g., in front of the spectator's eyes) and thus over participant 102 and/or object 104.

In certain embodiments, secondary grid 1202 may be virtual and determined by server 110 or viewing device 112. For example, secondary grid 1202 may be generated based upon virtual camera 606. As shown in FIGS. 12B and 12C, the secondary grid 1202 may be positioned perpendicular to the viewing direction of spectator 101. In certain embodiments, secondary grid 1202 may move and/or rotate as the location and/or viewing direction of spectator 101 changes. As shown in FIGS. 12B and 12C, cells of secondary grid 1202 may provide references, in combination with the virtual grid 1102, to enhance three-dimensional model 111 and/or viewing experience 200 based on three-dimensional model 111, and to render participant 102 and/or object 104 in more detail.

In certain embodiments, instructions 306, when executed by processor 302, may control processor 302 to interpolate between portions of the primary images (e.g., feeds F1-F4) to generate viewing experience 200.

In certain embodiments, instructions 306, when executed by processor 302, may control processor 302 to augment viewing experience 200 provided to the spectator 101 by providing the virtual image received from server 110. For example, where viewing experience 200 is augmented reality (or extended reality), server 110 may send one or more virtual images, generated from three-dimensional model 111, to viewing device 112 such that viewing device 112 may selectively enhance viewing experience 200.

Figure 13A:
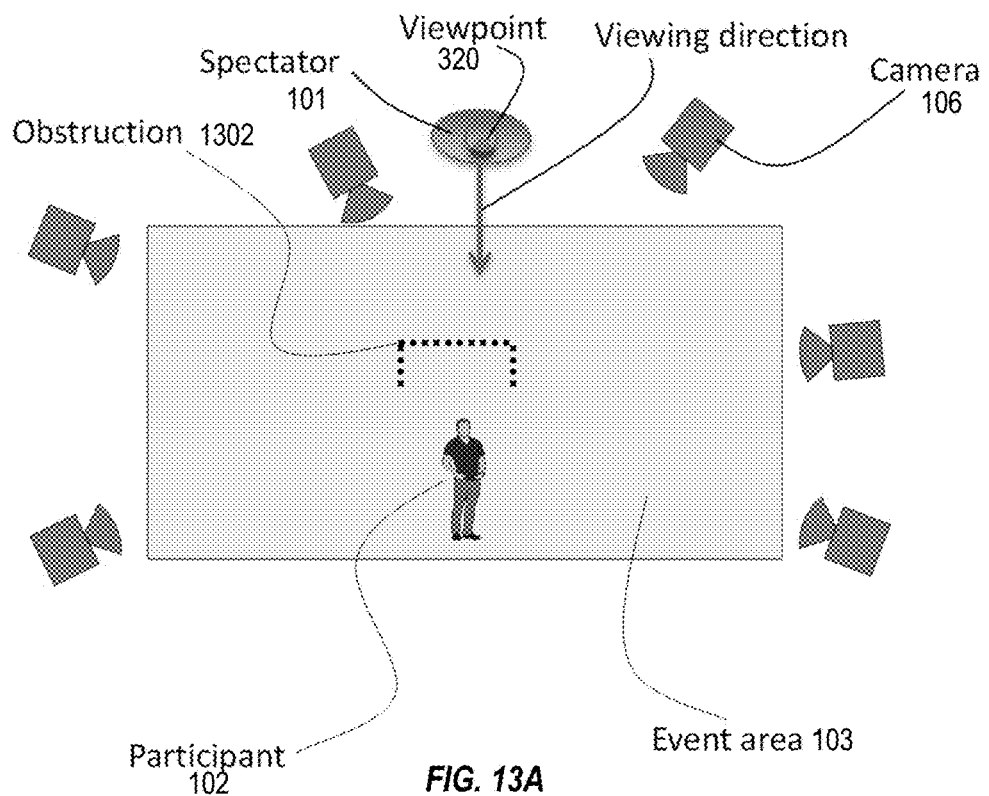
FIGS. 13A and 13B show an obstruction positioned between a spectator viewpoint or virtual camera and a participant.
Figure 14A:
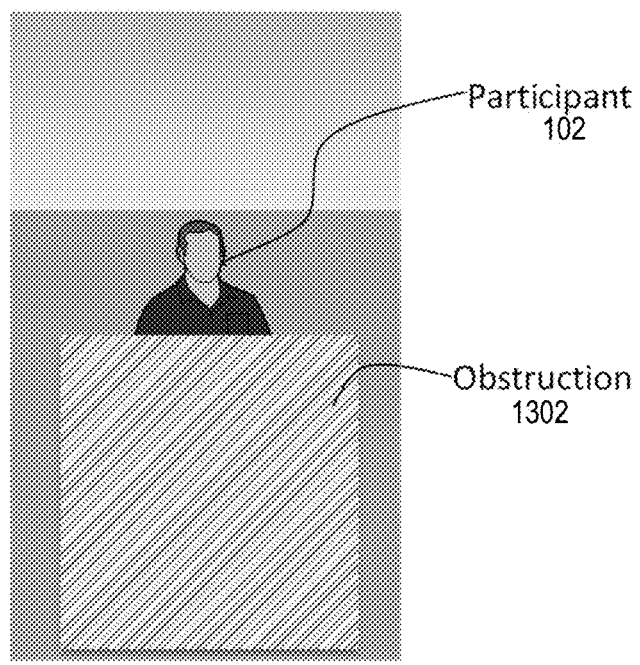
FIG. 14A shows a portion of a viewing experience where an obstruction blocks part of the participant.
Figure 14B:
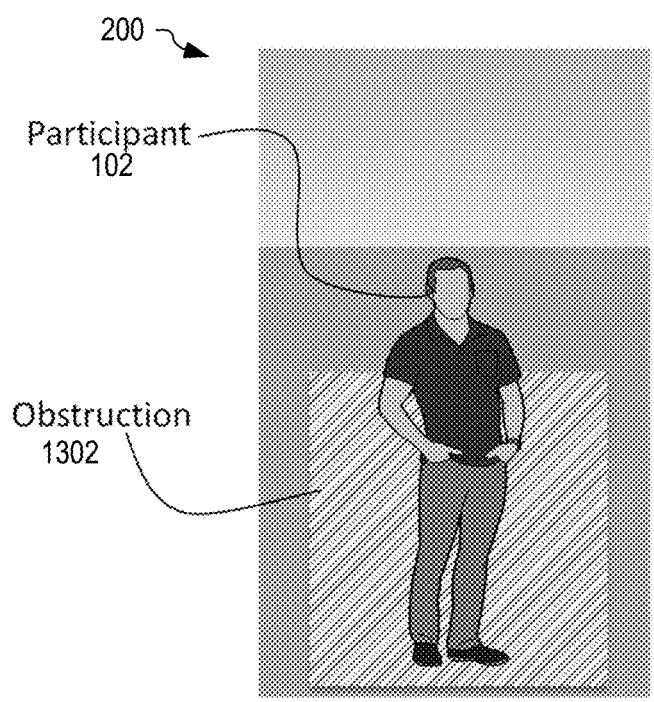
FIG. 14B shows the virtual experience where the participant is displayed through the obstruction, in embodiments.

In certain embodiments, instructions 306, when executed by processor 302, may control processor 302 to: (a) determine, based on three-dimensional model 111 and spectator viewpoint 320, when an obstruction is located between (i) the spectator viewpoint 320 and (ii) object 104 or participant 102; and (b) send directives to software module 506 to display at least a portion of the virtual image corresponding to the desired view without the obstruction. As shown in the example of FIG. 13A, an obstruction 1302 is located in event area 103 and positioned between spectator viewpoint 320 and participant 102. As illustrated in the example of FIG. 14A, obstruction 1302 may be a partial wall that obstructs a conventional view of participant 102 by spectator 101. FIG. 14B illustrates viewing experience 200 generated by server 110 of participant 102 displayed through obstruction 1302 such that spectator 101 may still fully view participant 102.

FIG. 6 shows system 100 of FIG. 5 further including at least one microphone 602 positioned around and/or within event area 103. In certain embodiments, instructions 306, when executed by processor 302, may control processor 302 to: (a) receive sound feeds F7 from at least one of microphones 602 positioned at and/or within event area 103; (b) map sound feeds F7 to three-dimensional model 111; and (c) generate viewing experience 200 to include sound based on one or more of (i) the spectator viewpoint 320 and (ii) occurrence of interest 130. In certain embodiments, any number of microphones 602 may be positioned within, around, and/or above event area 103. In other embodiments, one or more microphones 602 may be positioned on participant 102, such as shown in FIG. 10, and/or object 104. In FIGS. 6-8, sound feeds F7 from microphones 602 are input to server 110.

In certain embodiments, software module 506, when executed by processor 503, controls processor 502 to augment viewing experience 200 by providing at least part of sound feed F7 and provided by server 110. For example, viewing device 112 may generate viewing experience 200 to include sounds associated with the event, such as when participant 102 scores a goal in a sporting event. In another example, spectator 101 may hear words as they are spoken by participant 102.

FIG. 8 shows the system of FIG. 7 further illustrating generation of haptic feedback with viewing experience 200. Software module 506, when executed by processor 503, controls processor 502 to further augment viewing experience 200 by providing haptic feedback based at least in part upon occurrence of interest 130. Viewing device 112 may include a haptic feedback actuator 802 that include vibration-generating components. In one example of operation, occurrence of interest 130 may occur when two participants 102 hit each other, wherein haptic feedback actuator 802 is controlled such that spectator 101 feels a vibration. In another example, where viewing experience 200 is shared with another spectator, spectator 101 may receive haptic feedback, via haptic feedback actuator 802, from the other spectator. For example, where the other spectator likes the shared viewing experience as controlled by spectator 101, the other spectator may applaud or cheer, causing the feedback to be received and output by the viewing apparatus 112 of spectator 101.

FIG. 9 illustrates event area 103 of FIGS. 1 and 3-8 with spectators 101 located around event area 103 with free-viewpoint experiences. In certain embodiments, system 100 may create a free-viewpoint experience for spectator 101 by generating viewing experience 200 as an entirely virtual reality (as opposed to augmented reality based upon adding virtual images to an image of reality). In these embodiments, server 110 may generate viewing experience 200 based upon at least one virtual image generated from three-dimensional model 111 and send viewing experience 200 to viewing device 112 to provide the free-viewpoint experience to spectator 101. For example, instructions 306, when executed by processor 302, may control processor 302 to generate viewing experience 200 as a virtual image based at least in part upon at least a portion of three-dimensional model 111. Accordingly, spectator 101 receives viewing experience 200 as a real-time virtual experience generated from three-dimensional model 111 of the event occurring within the event area 103. However, since the viewing experience 200 is generated from three-dimensional model 111, spectator 101 may control a virtual camera 606 to create a free-viewpoint that is similar to spectator viewpoint 320, but need not be based upon a location of spectator 101 relative to event area 103.

Within server 110, instructions 306, when executed by processor 302, control processor 302 to: (a) determine, based on viewing directives received from viewing device 112 through interaction of spectator 101 with user controls 310, a virtual camera 606 defining an origin within three-dimensional model 111 and a corresponding viewing direction; and (b) generate viewing experience 200 as a virtual image based at least in part upon three-dimensional model 111 and corresponding virtual camera 606.

In the example of FIG. 9, spectator 101(3) controls virtual camera 606(1), via a virtual link 904(1), spectator 101(4) controls virtual camera 606(2), via a virtual link 904(2), and spectator 101(5) controls virtual camera 606(3), via a virtual link 904(3). Virtual camera 606 and virtual link 904 are terms used to define the free-viewpoint as controlled by spectator 101 to create the desired viewing experience 200.

In one example of operation, spectator 101(3) may have a seat that is distant from event area 103, but may interact with server 110 (using user controls 310 of viewing device 112) to position virtual camera 606(1) in a desired location to generate viewing experience 200 with a more favorable view of, or within, event area 103. For example, spectator 101(3) may position virtual camera 606(1) in front of the drum player on the stage. Spectator 101(3) thus received and view viewing experience 200 as based upon the defined free-viewpoint that is different from his/her physical location. In this example, the drum player is participant 102, the drums are object 104, the stage is event area 103, and the concert is the event being performed within the event area 103. Server 110 may simultaneously provide a different viewing experience 200 to each spectator 101, where certain ones of the viewing experiences may be based upon spectator viewpoints 320 derived from location of the spectator as determined by spectator tracking apparatus 402, and certain other of the viewing experiences are based upon virtual cameras 606 controlled by the corresponding spectator. Spectators 101 may switch between these different types of viewing experiences. In one example, spectator 101 watching a performer on a stage uses a mobile device (e.g., an iPad, or similar device), to position virtual camera 606 near the singer such that the mobile device displays viewing experience 200 with a close-up view of the singer. Thus, spectator 101 in their normal reality, with a normal view of the stage, uses virtual reality to bring the singer closer to their sitting position using system 100 and the mobile device.

In certain embodiments, system 100 may allow a first spectator 101 to view viewing experience 200 controlled by a second spectator 101, wherein the first spectator does not control, manipulate, or influence the viewing experience 200, since this viewing experience 200 is controlled by the second spectator.

In certain embodiments, software module 506 within viewing device 112 may include instructions, that when executed by processor 502, control processor 502 to: (a) determine, based on viewing directives received from the spectator via user controls 310, interact with server 110 to create and control virtual camera 606 to define an origin within the three-dimensional model and a viewing direction of the free-viewpoint experience, and (b) generate viewing experience 200 as virtual images showing at least a portion of three-dimensional model 111, based at least in part upon the corresponding virtual camera 606. In these embodiments, server 110 may send at least a portion of three-dimensional model 111 to viewing device 112, wherein virtual camera 606 may be implemented within viewing device 112 and software module 506 generates viewing experience 200 using the three-dimensional model and the free-viewpoint defined by the virtual camera.

In certain embodiments, instructions 306 and/or software module 506 may correct generation of viewing experience 200 (e.g., the virtual image) using primary images of video feeds F1-F4 corresponding to at least one cell of secondary grid 1202 corresponding to participant 102 and/or object 104 within the viewing experience 200. In these embodiments, server 110 may send at least part of three-dimensional model 111, and/or virtual images thereof, to viewing device 112, which may enhance and/or correct the virtual image and/or three-dimensional model 111 based on secondary grid 1202. In certain embodiments, software module 506 may also interpolate between any two of the primary images, for example when correcting the virtual image.

Figure 13B:
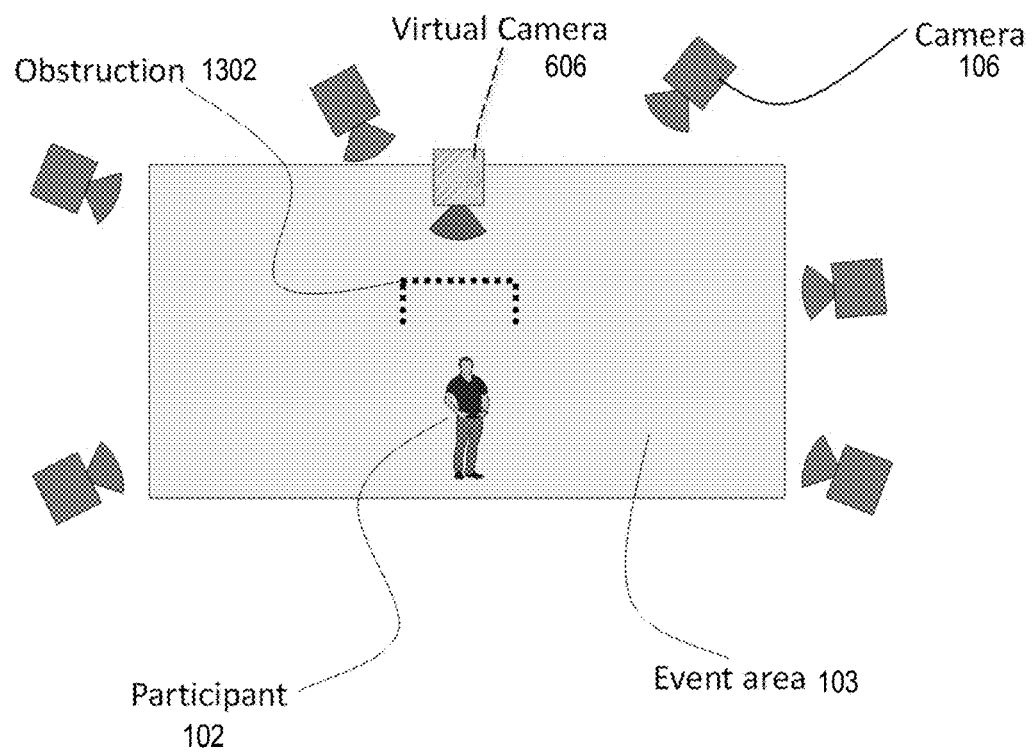

In certain embodiments, instructions 306, when executed by processor 302, control processor 302 to: (a) determine, based on three-dimensional model 111 and virtual camera 606, when an obstruction is located between virtual camera 606 and object 104 and/or participant 102; and (b) send directives to software module 506 to display at least a portion of the virtual image corresponding to the obstruction. In certain embodiments, instructions 306, when executed by processor 302, control processor 302 to remove an obstruction from the virtual image, when the obstruction is located between virtual camera 606 and participant 102 and/or object 104 within the virtual image. In the example of FIG. 13B, an obstruction 1302 is between participant 102 and virtual camera 606. FIG. 14A shows a portion of participant 102 is hidden by obstruction 1302, whereas in FIG. 14B, viewing experience 200, as received by spectator 101, shows obstruction 1302 removed, at least in part from the corresponding virtual image. Alternatively, participant 102 may be overlaid, using the corresponding virtual image, over obstruction 1302, to generate viewing experience 200 to show the participant to the spectator 101.

In certain embodiments, instructions 306, when executed by processor 302, control processor 302 to determine occurrence of interest 130 (FIG. 1) based at least in part upon three-dimensional model 111 and virtual camera 606, determining at least an identity and coordinates, relative to three-dimensional model 111, for occurrence of interest 130. For example, when detected, occurrence of interest 130 may be tagged such that it may be selected and viewed by spectators 101. As described above, server 110 may send directives to software module 506 to provide visual and/or audible special effects 202, within viewing experience 200, based at least in part upon three-dimensional model 111, virtual camera 606, and occurrence of interest 130. In certain embodiments, instruction 306, when executed by processor 302, may control processor 302 of server 110 to add, to the virtual image, visual and/or audible special effects 202 based at least in part upon three-dimensional model 111, virtual camera 606, and occurrence of interest 130.

In certain embodiments, software module 506 may control processor 502 to determine occurrence of interest 130 based at least in part upon three-dimensional model 111 and virtual camera 606, determining at least an identity and coordinates, relative to three-dimensional model 111, for occurrence of interest 130. Software module 506 may also control processor 502 to generate visual and/or audible special effects 202 within viewing experience 200, based at least in part upon three-dimensional model 111, virtual camera 606, and occurrence of interest 130.

In certain embodiments, server 110 may be configured to generate viewing experience 200 with sounds based at least in part upon three-dimensional model 111 and virtual camera 606. These sounds may be determined by processing and mapping sound feeds F7 received from microphones 602 at event area 103. For example, sound feeds F7 may be processed and mapped based upon the location of virtual camera 606 within three-dimensional model 111, such that viewing experience 200 has sounds according to that location.

In certain embodiments, software module 506, when executed by processor 502, may control processor 502 to process sounds stored within three-dimensional model 111, and/or sounds of sound feeds F7, to generate sounds within viewing experience 200 based at least in part upon three-dimensional model 111 and virtual camera 606.

In certain embodiments, software module 506 may also control processor 502 to generate haptic feedback, using haptic feedback actuator 802, to further enhance viewing experience 200, based at least in part upon virtual camera 606 and occurrence of interest 130. In particular, the haptic feedback may be generated based at least in part upon a location of virtual camera 606 within three-dimensional model 111 relative to participant 102, object 104, a border of event area 103, and/or one or more permanent objects within event area 103. For example, when spectator 101 controls virtual camera 606 to have a location of a permanent object within event area 103, software module 506 may control haptic feedback actuator 802 to generate the haptic feedback (e.g., a vibration) to indicate that the location of virtual camera 606 is not valid. In another example, software module 506 may control haptic feedback actuator 802 to generate the haptic feedback (e.g., a vibration) when spectator 101 maneuvers virtual camera 606 to virtually "bump" into participant 102 and/or object 104.

In another example, consider when participant 102 is a quarterback and object 104 is an American football. The quarterback throws the football to a point in space. System 100 generates viewing experience 200 based upon virtual camera 606 positioned at the point in space and facing the quarterback. Spectator 101 appears to receive the football from the quarterback using viewing experience 200 viewed by on viewing device 112 (e.g., an iPad or similar device). Accelerometer, gyroscopes, and/or other sensors within viewing device 112 may sense movement of viewing device 112 by spectator 101; and this sensed movement may manipulate virtual camera 606, such that spectator 101 may attempt to manipulate virtual camera 606 into the path of the ball. When object 104 hits virtual camera 606, system 100 may generate haptic feedback on viewing device 112 so simulate the ball being caught by spectator 101. Viewing experience 200 (of the attempted catch) may be shared with followers of spectator 101, wherein the followers may also cause haptic feedback on viewing device 112 in an attempt to distract spectator 101 from making the catch. For example, viewing experience 200 may be shared through social media networks, wherein messaging of the social media networks may be used for the feedback from the followers.

In certain embodiments, rendering of three-dimensional model 111 may be enhanced by mapping light-field data onto at least a portion of three-dimensional model 111, in addition to mapping of portions of the image feeds F1-F4 onto three-dimensional model 111. Capture and mapping of light-field data may also include capturing and mapping of light data corresponding to reflections, as noted previously.

Figure 20:
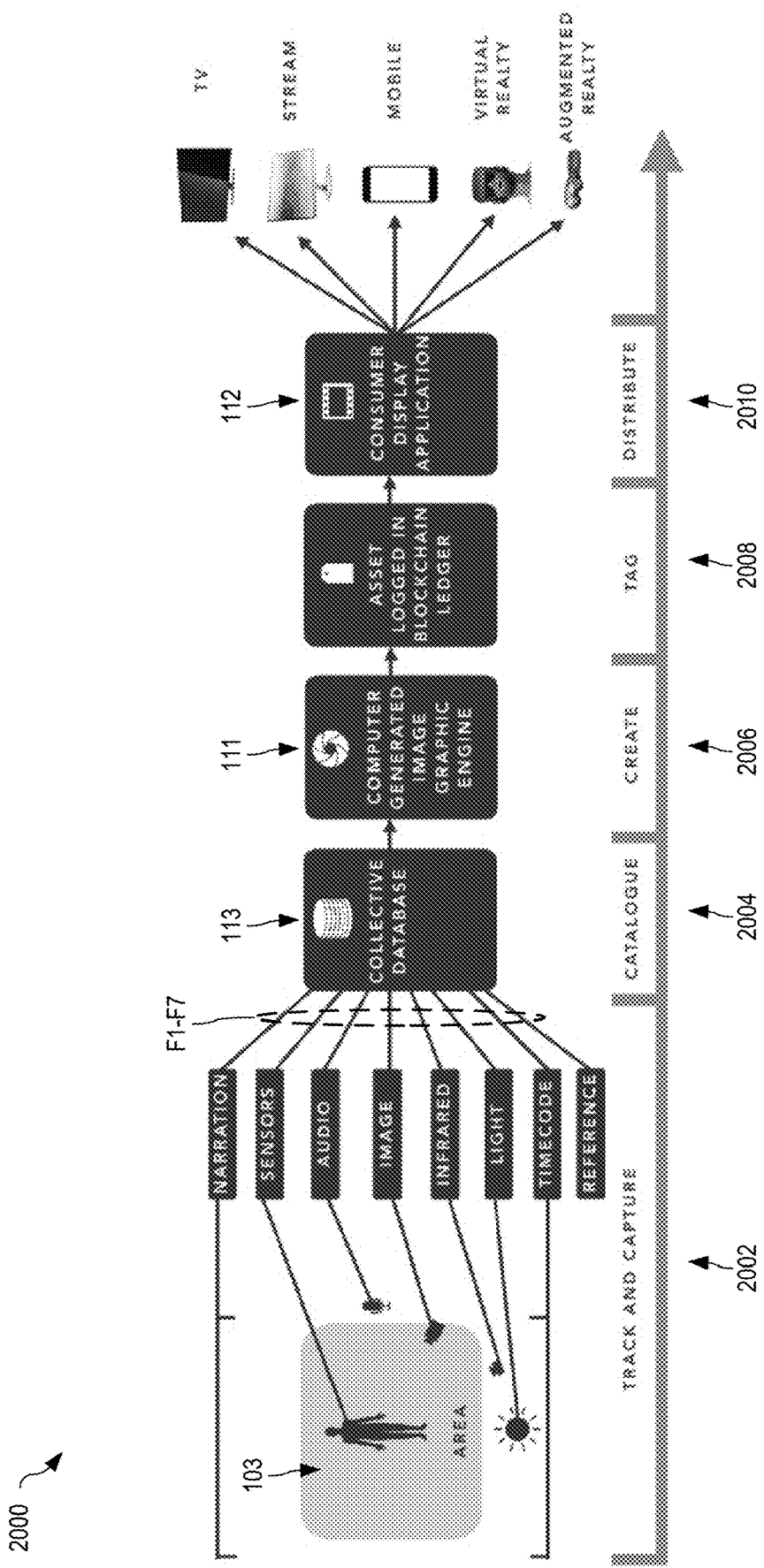
FIG. 20 is a schematic overview of the systems of FIGS. 1, and 3-14, in embodiments.

FIG. 20 shows a high level operational overview 2000 of system 100 of FIGS. 1, and 3-14. Overview 2000 shows five stages of operation of system 100. In a first stage 2002, system 100 tracks and captures data from event area 103. For example, cameras 106, event tracking apparatus 108, spectator tracking apparatus 402, and microphones 602 generate data feeds F1-F7 of movement and activity of participants 102 and objects 104 within event area 103. In a second stage 2004, system 100 catalogs the data feeds F1-F7 and stores them within collective database 113. In a third stage 2006, system 100 generates three-dimensional model 111 as at least part of the computer-generated image graphic engine. In a fourth stage 2008, system 100 tags the event, potions thereof, and occurrences of interest 130 within database 113 and/or a BlockChain ledger. In a fifth stage 2010, system 100 uses viewing devices 112 to display viewing experiences 200 generated from three-dimensional model 111.

FIGS. 15-19 are flowcharts that collectively show one example method 1500 for creating a viewing experience. Method 1500 includes steps 1502-1506, as shown in FIG. 15A, and may further include any combination of steps 1508-1560 shown in FIGS. 15B, 16A, 16B, 17A, 17B, 18A, 18B, 19A, and 19B.

In step 1502, method 1500 determines location and movement data. In one example of step 1502, event tracking apparatus 108 determines location data and movement data of participants 102 and objects 104. In step 1504, method 1500 determines a three-dimensional model. In one example of step 1504, server 110 generates three-dimensional model 111 based upon location and event data feed F5 and image feeds F1-F4. In step 1506, method 1500 determines a spectator viewpoint. In one example of step 1506, instructions 306, when executed by processor 302, control processor 302 to determine spectator viewpoint 320 defining an origin, relative to three-dimensional model 111, and a direction for viewing experience 200.

Figure 15A:
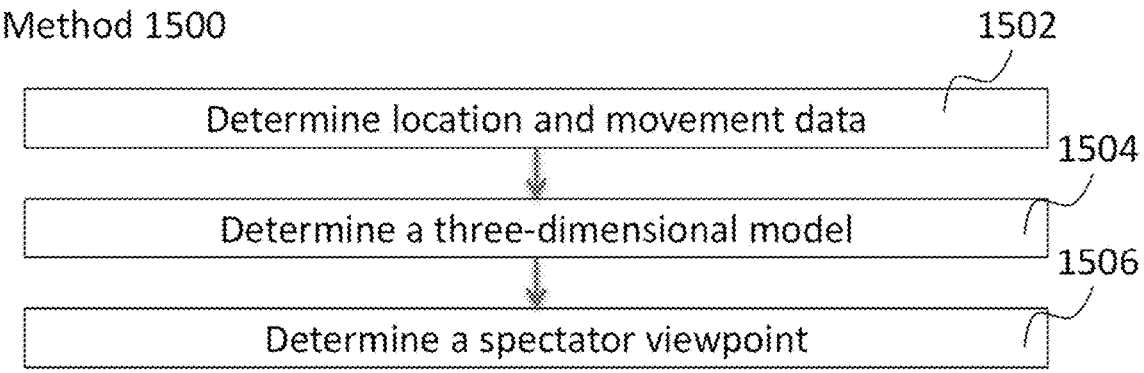
FIGS. 15A-19B are flowcharts illustrating a method for creating a viewing experience, according to certain embodiments.
Figure 15B:
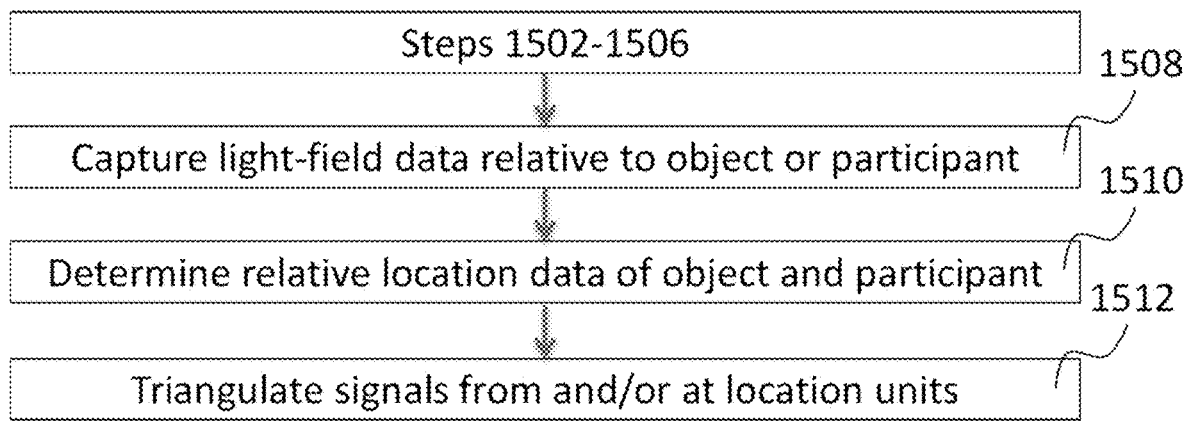

In step 1508, FIG. 15B, method 1500 captures light-field data relative to the object and the participant. In one example of step 1508, server 110 processes image feeds F1-F4 and other sensed data (e.g., feeds F5, F6, F7) to determine light-field data for one or more of object 104 and participant 102 (and even the spectator 101). In step 1510, method 1500 determines relative location data, of the object and the participant. In one example of step 1510, server 110 determines relative location data for each of objects 104 and participants 102, with respect to one or more of (i) a permanent object location at the arena, (ii) other objects 104 within event area 103, (iii) other participants 102 within event area 103, and (iv) secondary grid at the arena. In step 1512, method 1500 triangulates signals from and/or at location units. In one example of step 1512, event tracking apparatus 108 triangulates signals from location units 1002, where the signals are selected from the group consisting of sound, radio waves, microwaves, ultraviolet light, visible light, infrared light, and any combinations thereof.

Figure 16A:
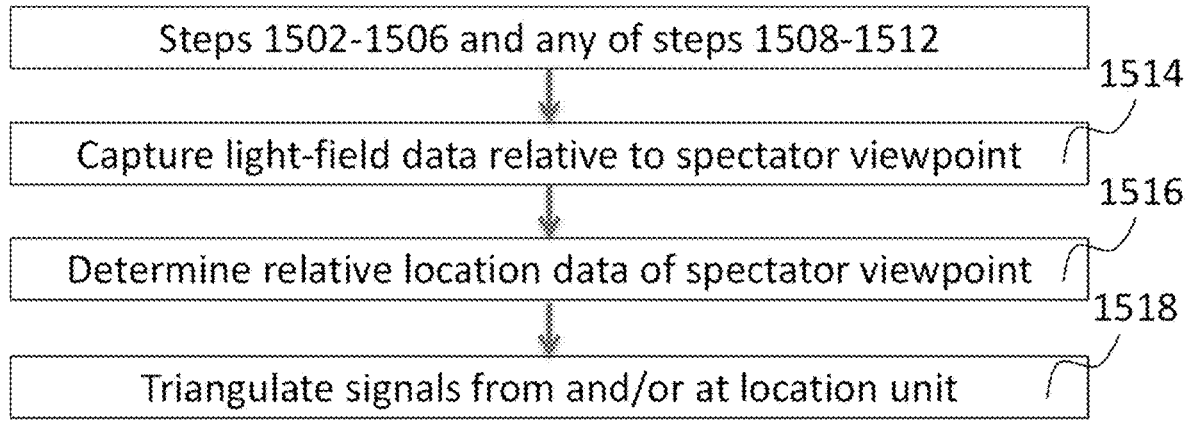

FIG. 16A shows steps 1514-1518. In step 1514, method 1500 captures light-field data relative to the spectator viewpoint. In one example of step 1514, server 110 determines light-field data from image feeds F1-F4 with respect to spectator viewpoint 320. In step 1516, method 1500 determines relative location data, of the viewpoint, with respect to one or more of (i) a permanent object location at the arena, (ii) the at least one object, (iii) the at least one participant, and (iv) a secondary grid at the arena. In one example of step 1516, server 110 determines relative locations of spectator viewpoint 320 with respect to one or more of three-dimensional model 111, object 104, participant 102, and/or secondary grid 1202. In step 1518, method 1500 triangulates signals that are emitted from and/or received by a location unit configured with the spectator. In one example of step 1518, spectator tracking apparatus 402 triangulates signals received from location unit 1002 attached to spectator 101, where the signal is selected from the group comprising sound, radio waves, microwaves, ultraviolet light, visible light, infrared light, and any combinations thereof.

Figure 16B:
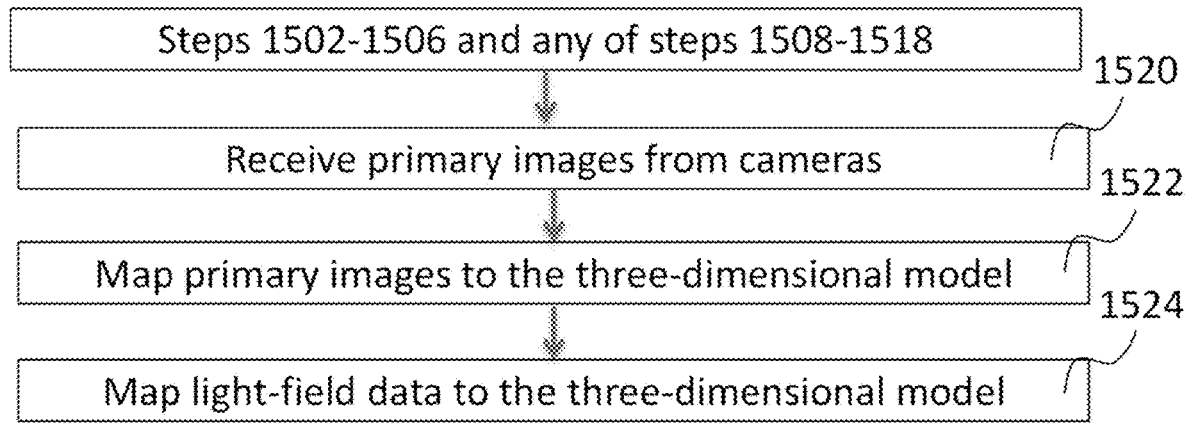

FIG. 16B shows steps 1520-1524. In step 1520, method 1500 receives primary images from a plurality of cameras positioned at an event area. In one example of step 1520, server 110 receives image feeds F1-F4 from cameras 106. In step 1522, method 1500 maps at least one of the images, from cameras 106, to the three-dimensional model. In one example of step 1522, server 110 maps at least part of images from image feeds F1-F4 to three-dimensional model 111. In step 1524, method 1500 maps light-field data to the three-dimensional model. In one example of step 1524, server 110 maps light-field data to three-dimensional model 111.

Figure 17A:
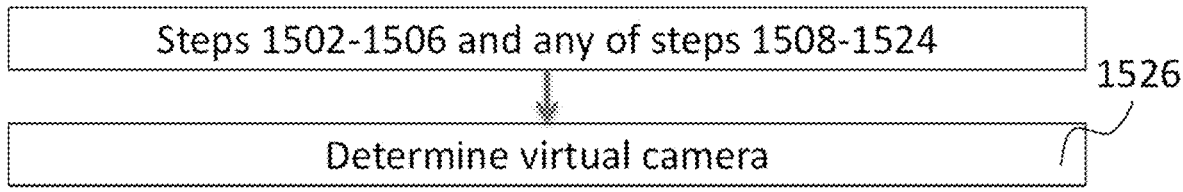

FIG. 17A shows step 1526, where method 1500 determines, based on viewing directives received from the spectator, a virtual camera defining a virtual origin, relative to the three-dimensional model, and a virtual direction of the viewing experience. In one example of step 1526, instructions 306, when executed by processor 302, control processor 302 to receive input from viewing device 112, to manipulate a virtual camera 606 within three-dimensional model 111 to have a particular location and viewing direction such that server 110 and/or viewing device 112 generates a desired viewing experience 200.

Figure 17B:
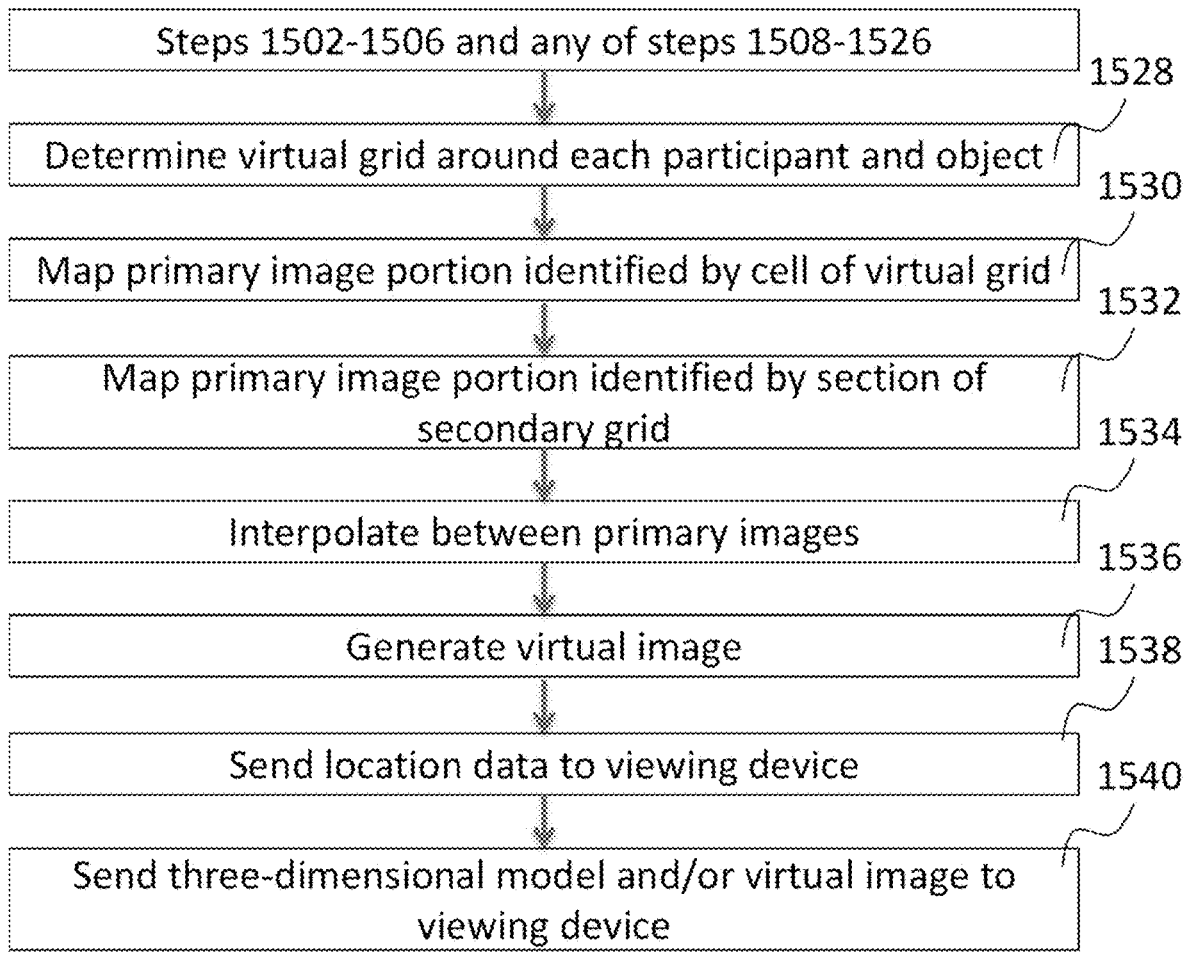

FIG. 17B shows steps 1528-1540. In step 1528, method 1500 determines, within the three-dimensional model, around each of the participant and the object, a virtual grid having a plurality of cells. In one example of step 1528, instructions 306, when executed by processor 302, control processor 302 to determine virtual grid 1102 around participant 102 within three-dimensional model 111. In step 1530, method 1500 maps at least a portion of one of the primary images identified by at least one cell of the virtual grid corresponding to the participant or object. In one example of step 1530, instructions 306, when executed by processor 302, control processor 302 to map corresponding portions of images from image feeds F1-F4 to virtual grid cells 1104 within three-dimensional model 111. In step 1532, method 1500 maps at least a portion of one of the primary images identified by a section of the secondary grid corresponding to the participant or object. In one example of step 1532, instructions 306, when executed by processor 302, control processor 302 to map, based upon secondary grid 1202 corresponding to participant 102 and/or object 104, at least a portion of primary images from primary image feeds F1-F4 to participant 102 and/or object 104. In step 1534, method 1500 interpolates between any two of the primary images. In one example of step 1534, instructions 306, when executed by processor 302, control processor 302 to interpolate between at least two images of image feeds F1-F4 when mapping. In step 1536, method 1500 generates a virtual image, having the object and/or the participant, based upon (i) the three-dimensional model and (ii) the viewpoint or the virtual camera. In one example of step 1536, instructions 306, when executed by processor 302, control processor 302 to generate a virtual image from three-dimensional model 111 based upon spectator viewpoint 320 and/or virtual camera 606. In step 1538, method 1500 sends the location data of the object and the participant to a viewing device configured to provide the viewing experience. In one example of step 1538, instructions 306, when executed by processor 302, control processor 302 to send the location of object 104 and/or participant 102 to viewing device 112. In step 1540, method 1500 sends one or both of (i) at least a portion of the three-dimensional model and (ii) at least a portion of the virtual image, to a viewing device configured to provide the viewing experience. In one example of step 1540, instructions 306, when executed by processor 302, control processor 302 to send at least part of three-dimensional model 111 and/or at least part of viewing experience 200 to viewing device 112.

Figure 18A:
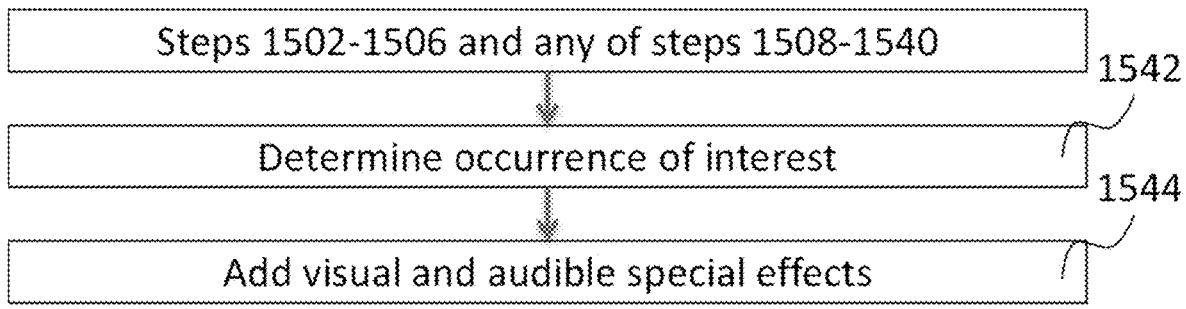

FIG. 18A shows steps 1542 and 1544. In step 1542, method 1500 determines an occurrence of interest. In one example of step 1542, instructions 306, when executed by processor 302, control processor 302 to determine occurrence of interest 130 within three-dimensional model 111 based upon one or more of participant 102, object 104, spectator viewpoint 320, and virtual camera 606. In step 1544, method 1500 adds visual special effects and audible special effects to the viewing experience. In one example of step 1544, instructions 306, when executed by processor 302, control processor 302 to generate visual and/or audible special effects 202 for viewing experience 200 based at least in part upon (i) the location data and movement data of object 104 and/or participant 102 and/or (ii) occurrence of interest 130.

Figure 18B:
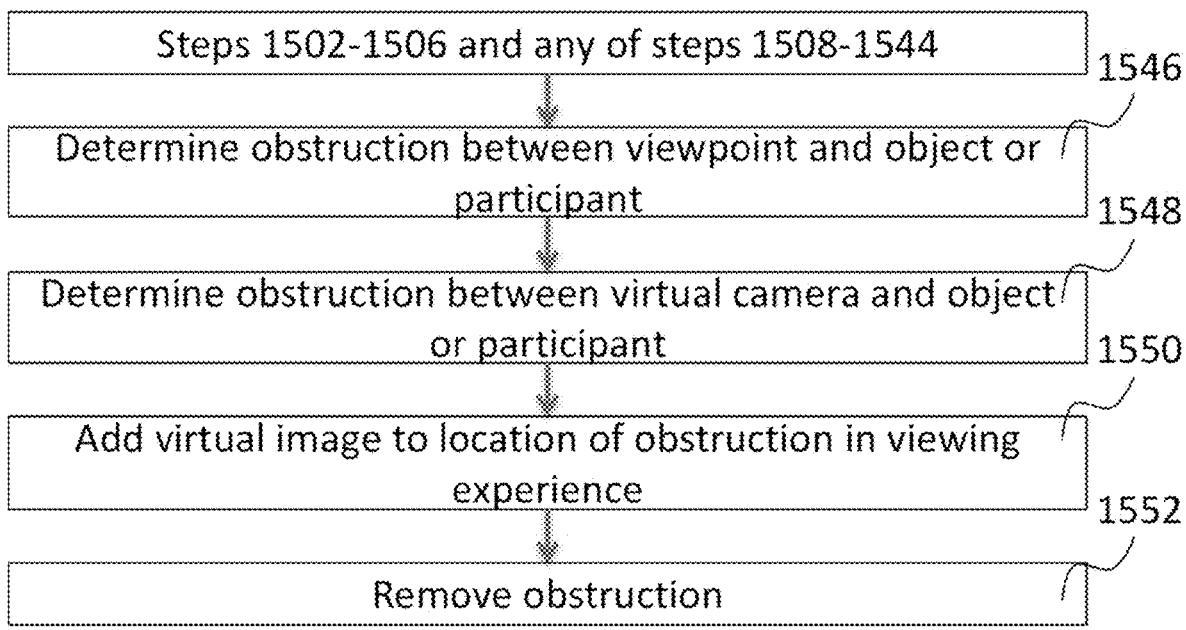

FIG. 18B shows steps 1546-1552. In step 1546, method 1500 determines when an obstruction is located between (i) the viewpoint and (ii) the object or the participant. In one example of step 1546, instructions 306, when executed by processor 302, control processor 302 to process three-dimensional model 111 to determine when obstruction 1302 is between spectator viewpoint 320 and participant 102 and/or object 104. In step 1548, method 1500 determines when an obstruction is located between (i) the virtual camera and (ii) the object or the participant. In one example of step 1548, instructions 306, when executed by processor 302, control processor 302 to process three-dimensional model 111 to determine when obstruction 1302 is between virtual camera 606 and object 104 and/or participant 102. In step 1550, method 1500 adds at least a portion of the virtual image, corresponding to the location of the obstruction, to the viewing experience. In one example of step 1550, instructions 306, when executed by processor 302, control processor 302 to generate viewing experience 200 from at least one virtual image created from three-dimensional model 111 based upon the location of the obstruction. In step 1552, method 1500 removes the obstruction from the viewing experience. In one example of step 1552, instructions 306, when executed by processor 302, control processor 302 to remove at least part of obstruction 1302 from viewing experience 200.

Figure 19A:
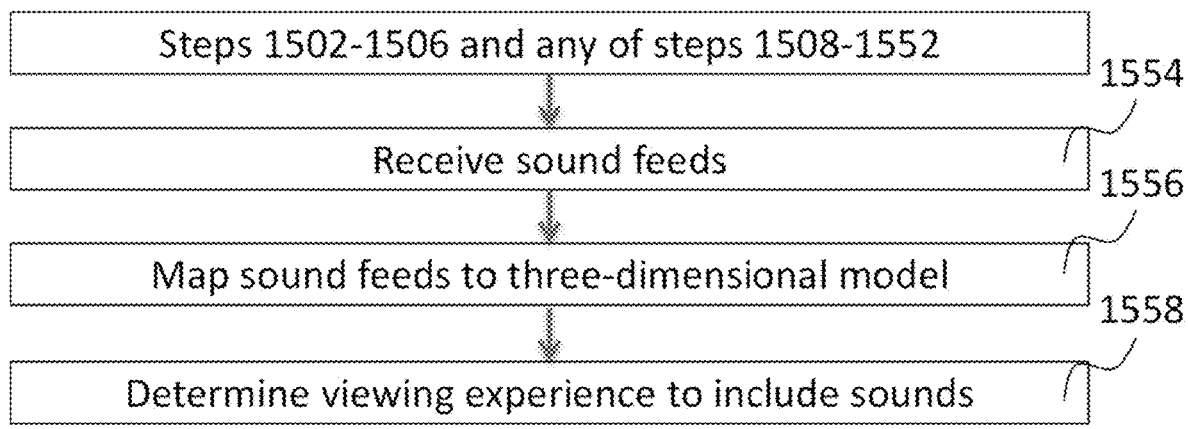

FIG. 19A shows steps 1554-1558. In step 1554, method 1500 receives sound feeds from a plurality of microphones positioned at the event area. In one example of step 1554, server 110 receives sound feeds F7 from microphones 602 positioned around and within event area 103. In step 1556, method 1500 maps the sound feeds to the three-dimensional model. In one example of step 1556, instructions 306, when executed by processor 302, control processor 302 to map sounds from sound feeds F7 to three-dimensional model 111 based upon the location of the microphones 602 relative to the event area 103. In step 1558, method 1500 generates the viewing experience to include sounds based upon the three-dimensional model. In one example of step 1558, instructions 306, when executed by processor 302, control processor 302 to generate viewing experience 200 to include sounds based upon three-dimensional model 111.

Figure 19B:
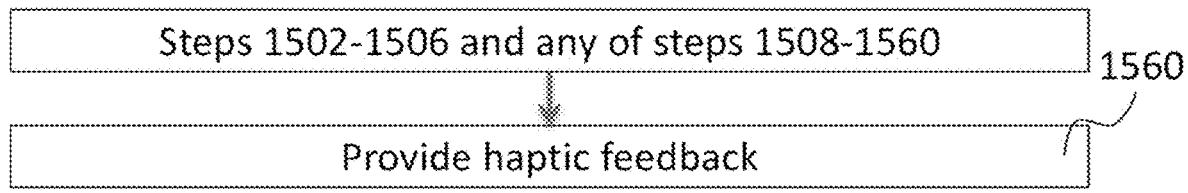

FIG. 19B shows step 1560. In step 1560, method 1500 provides haptic feedback to the spectator based on the virtual camera and the location data of the object and the participant. In one example of step 1560, server 110 and viewing device 112 cooperate to control haptic feedback actuator 802 to provide haptic feedback to spectator 101 based at least in part upon one or more of a location of a corresponding virtual camera 606 within three-dimensional model 111, a location of participant 102 within the three-dimensional model 111, and a location of object 104 within the three-dimensional model 111. In another example of step 1560, server 110 and viewing device 112 cooperate to control haptic feedback actuator 802 to provide haptic feedback to spectator 101 based at least in part upon occurrence of interest 130 and/or visual and/or audible special effects 202.

Example 1—Triangulation of Known and Estimated Points to Create Viewpoint for a Virtual Camera Example 1 provides a description of systems and methods for creating a viewpoint including a model of a designated geometric shape where data is derived from multiple known and estimated points resulting in multiple data registries to be used in perceived and actual reality. The result of this method is a set of data points capable of augmenting and re-creating particular moments in time in a defined multi-dimensional space.

The present disclosure relates to systems and methods configured to facilitate live and recorded mixed, augmented reality, virtual reality, and extended reality environments.

In the present example, a viewpoint is created by solving for the human condition of defining when and where a spectator is viewing an event within an area by accounting for ocular device(s) and spatially separated equilibrium/sound input device(s) inside a determined area (devices can be but are not limited to cameras, microphones, pressure sensors.) A virtual logarithmic netting is determined around each key individual area (see, e.g., FIGS. 11-12). This creates multiple data sets defined as Mixed Augmented Virtual Reality objects or MAVR object for short. The MAVR objects are applied into a multidimensional landscape by using spatial X+Y+Z coordinates and + time for each MAVR object to create the MAVR core. This core netting provides multiple specific data points to see what is happening in relation to the experiencer (A) the object(s) of focus (C) and the logarithmic net (B). These three points create a very specific range When a spectator is in the stands, the spectator knows his/her location where the pitcher is, but more accuracy is gained from having an intermediate reference point. If the spectator is behind home plate, the spectator may be looking through a net. The net acts as a logarithmic medium for which to segment the viewing experience into small microchambers. The net is for example used as an X/Y graph. The X/Y graph is applied to that of the spectator's right eye and the spectator's left eye, and because of the offset, the spectator's brain determines the spatial relationship and occludes the net from the spectator's sight.

A game may be played wherein the entire arena is enclosed in a large plexiglass cage. Where the cage is joined for each panel there is a sensor capable of being a grid marker for MAVR devices. Each player in the game wears an array of sensors and cameras. Each physical structure in the game has an array of sensors and cameras and each has known, fixed values. Each flying ball has a tracking device in it. All of these features have live data sets captured at fifteen times a second or more. In an embodiment, at least a portion of the live data sets are captured periodically at a certain speed (e.g., one hundred and twenty times per second, although other speeds may be used). The location and movement data is exported into a server to model the data and determine unknowns based on the model. Missing data points are determined using known data points. When the model of the game is fixed into a known space, the existing cameras are used to create visual mesh models of the objects that are moving and not moving based on lighting conditions (e.g., live texture mapping of real and estimated real objects).

Within the MAVR Core space animate or inanimate objects have a gridagonal grid determined around them. The grid space (or, virtual grid) is cross cut horizontally to create the start of a grid system for the object. The space is layered vertically to create virtual/assumed sections of volumetric space where the object may be sliced into smaller data sets. Nothing changes physically to the object inside the grid. The grid space is used to measure and render the object in relation to the data intersections at all dimensions within the grid. In using this model only a small portion of what is actually visible may be visible to the optical (viewing) device using the MAVR core. However, a combination of multiple ocular devices using the core capture different cross sections of the grid and send the location data back to the server to create a virtualized and accurate model of the subject inside the grid space while the primary camera only has limited view. As the data is filled in from the other core devices, the estimated and the real images are layered into a depth map that matches true reality. Once the full model is known for the object within the space the empty space, not corresponding to the object or the participant, is not relevant and dismissed.

A further aspect of the systems and methods of this example is establishing an intermediary (secondary) grid between the spectator and the object or participant. This increases accuracy at distance by increasing the points of data through adding a secondary grid system. This system is three dimensional yet flat in its presentation to the viewing camera as opposed to the gridagonal approach. Adding the secondary grid to the already created model gives the second layer of accuracy and can be at any angle to the original grid model. This is relevant to accuracy at a distance. A spectator behind home plate, for example, looking through the net has a different viewing angle than a spectator is sitting a few feet away. Yet with the known and estimated models created via the MAVR core system, the secondary grid is used to increase model accuracy. The secondary grid is flat to the eyes and stays fixed to the head's rotation. Having two layers of grids (virtual grid and secondary grid) allows more points of data to increase the accuracy of tracking movement in the pixel grid. The distance between the intermediary grid and the virtual grid helps delineate movement at a greater accuracy inside the virtual grid. Layering the two grid systems on top of each increases the accuracy and ability to create a free viewpoint camera system.

A further embodiment of this example is triangulation of different angles to create the grid model of objects. The spectator off to a side of the event area view the event through the virtual and secondary grids. Using other known angles, such as of another spectator and his/her viewpoint, the model can be filled in.

As participants move, their position the mathematics to track the grid around objects is adjusted in real time. Distance calculations are used to make sure virtual objects show up in the proper place in the model and virtual image. These calculations are used to ensure special effects are properly determined spatially and in time.

Figure 21:
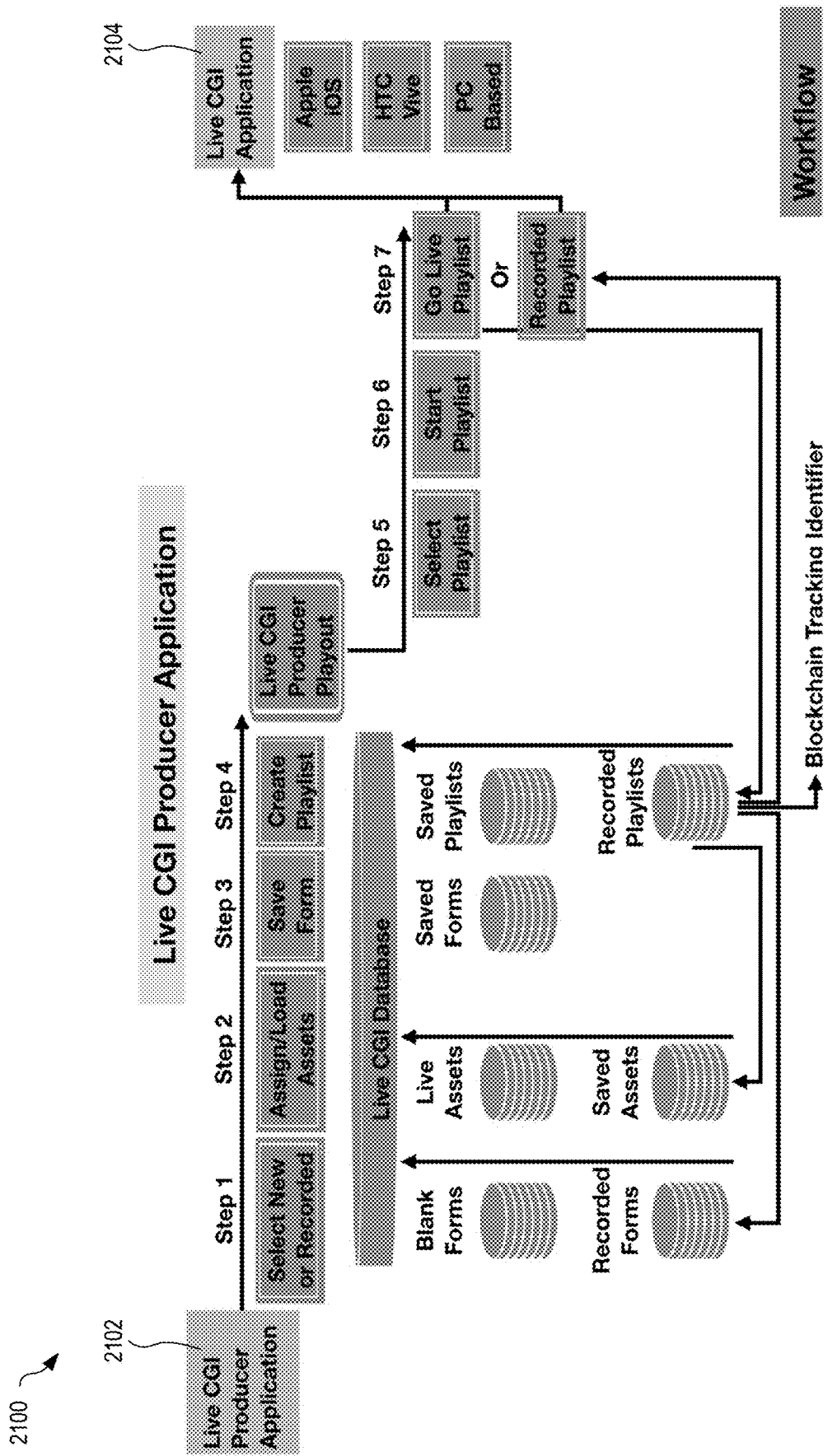
FIG. 21 is a playout workflow of the systems of FIGS. 1, and 3-14, in embodiments.

FIG. 21 is a playout workflow 2100 of the systems of FIGS. 1, and 3-14. Workflow 2100 illustrates a live CGI producer application 2102 generating a playout that may be viewed by a live CGI application 2104. Live CGI producer application 2102 may be implemented within server 110 of FIG. 1, and live CGI application 2104 may be implemented within viewing device 112.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present system and method, which, as a matter of language, might be said to fall there between.

What is claimed is:

1. A process for generating a viewing experience, comprising:
   determining, in real-time, location data and movement data of both a participant of a plurality of participants and an object within an event area;
   generating, in real-time, a three-dimensional model of the event area, the plurality of participants, and the object based, at least in part, upon the location data and the movement data;
   receiving, from a spectator, a viewpoint defining an origin and a direction of the viewing experience relative to the three-dimensional model, the viewpoint being any origin and any direction;
   receiving a plurality of primary images from at least one of a plurality of cameras positioned at the event area;
   generating, within the three-dimensional model and around each participant of the plurality of participants, a respective virtual grid of a plurality of virtual grids, each virtual grid having a plurality of virtual grid cells;
   mapping a portion of the primary images to the three-dimensional model, the portion being identified by at least one of the virtual grid cells corresponding to the viewpoint; and
   generating the viewing experience including at least a portion of the three-dimensional model for the viewpoint.

2. The process of claim 1, the step of generating comprising implementing bokeh by blurring parts of the viewing experience that are less important to reduce latency of generating the viewing experience.

3. The process of claim 1, further comprising enhancing the three-dimensional model using light-field data captured relative to the object and the participant.

4. The process of claim 1, further comprising enhancing the three-dimensional model using light-field data captured relative to the viewpoint.

5. The process of claim 1, the step of determining the location data and the movement data of the participant further comprising determining one or more of head movement, hand movement, and posture.

6. The process of claim 1, the viewpoint corresponding to a virtual camera relative positioned to the three-dimensional model, the virtual camera being controlled by the spectator to generate the viewing experience.

7. The process of claim 1, generating the viewing experience comprising:
   generating at least one image of the three-dimensional model including one of the object and the participant based upon the viewpoint; and
   sending the at least one image to a viewing device configured to provide the viewing experience to the spectator.

8. The process of claim 1, generating the viewing experience comprising sending at least a portion of the three-dimensional model to a viewing device configured to provide the viewing experience.

9. The process of claim 1, further comprising:
   mapping at least a portion of the primary images identified by a section of a secondary virtual grid between the viewpoint and the object or the participant, wherein the secondary virtual grid corresponds to the object or the participant and identifies cells of the virtual grid cells necessary to generate the viewing experience.

10. The process of claim 1, further comprising generating, within the three-dimensional model, one or both of visual special effects and audible special effects, based upon an occurrence of interest detected within the event area.

11. The process of claim 10, the occurrence of interest corresponding to one or both of (a) the location data and the movement data of the object and (b) the location data and the movement data of the participant.

12. The process of claim 1, further comprising:
    receiving sound feeds from a plurality of microphones positioned at the event area;
    mapping the sound feeds to the three-dimensional model; and
    generating the viewing experience to include sounds based upon the three-dimensional model.

13. The process of claim 1, further comprising generating haptic feedback based at least in part upon one or more of (a) the virtual camera and the location data of the object and the participant, (b) an occurrence of interest detected within the event area and visual and audio special effects, and (c) feedback from other spectators sharing the viewing experience, wherein the visual experience includes the haptic feedback.

14. The process of claim 1, portions of the primary image not corresponding to the at least one virtual grid cell not being mapped to the three-dimensional model.

15. A system for generating a free-viewpoint viewing experience for a spectator, comprising:
    a plurality of cameras positioned at an event area to capture primary images of an event in the event area;
    at least one first location unit attached to an object of the event;
    at least one second location unit attached to a participant of the event;
    tracking apparatus comprising a computer server configured to determine location data and movement data of (a) the object based on the first location unit and (b) the participant based on the second location unit, the participant being one of a plurality of participants; and
    a server having a processor and memory storing machine readable instructions that, when executed by the processor, control the processor to:
       receive the primary images from the plurality of cameras;
       generate, within the memory, a virtual three-dimensional model of the event area, the participant and the object based, at least in part, upon the primary images, the location data and the movement data of the participant, and the location data and the movement data of the object;
       receive a viewpoint from the spectator;
       generate, within the three-dimensional model and around each participant of the plurality of participants, a respective virtual grid of a plurality of virtual grids, each virtual grid having a plurality of virtual grid cells;
       map a portion of the primary images to the three-dimensional model, the portion being identified by at least one of the virtual grid cells corresponding to the viewpoint;
       generate the viewing experience including at least a portion of the three-dimensional model based upon the viewpoint; and
       send the viewing experience to a viewing device of the spectator.

16. The system of claim 15, further comprising machine readable instructions that, when executed by the processor of the server, control the processor to:

determine, based on the viewpoint, a virtual camera defining an origin within the three-dimensional model and a direction of the virtual camera; and generate, based upon the virtual camera, at least one virtual image of the three-dimensional model to form the viewing experience.

17. The system of claim 15, the map a portion of the primary images comprising:

mapping at least a portion of the primary images identified by a section of a secondary grid between the viewpoint and the object or the participant, wherein the secondary grid corresponds to the object or the participant and identifies cells of the virtual grid cells necessary to generate the viewing experience.

18. A system for generating a viewing experience of a live event, comprising:

a server having a first processor and first memory storing machine readable instructions that, when executed by the processor, control the first processor to:

determine, in real-time, location data and movement data of both a participant of a plurality of participants and an object of the live event within an event area;

generate, in the first memory and in real-time, a three-dimensional model of the event area, the plurality of participants, and the object based, at least in part, upon the location data and the movement data;

generate, within the three-dimensional model and around each participant of the plurality of participants, a respective virtual grid of a plurality of virtual grids, each virtual grid having a plurality of virtual grid cells;

map a portion of a plurality of primary images captured of the live event to the three-dimensional model, the portion being identified by at least one of the virtual grid cells; and send, in real-time, at least part of the three-dimensional model to a viewing device; and the viewing device having a second processor and second memory storing machine readable instructions that when executed by the second processor, control the second processor to:

receive the at least part of the three-dimensional model from the server;

receive, from a spectator, a viewpoint having any origin and any direction and defining an origin and a direction of the viewing experience relative to the three-dimensional model, the viewpoint being any origin and any direction; and generate the viewing experience including the at least part of the three-dimensional model based upon the viewpoint.

19. The system of claim 18, wherein latency between the live event and presenting the viewing experience is reduced by blurring parts of the viewing experience that are less important.

20. The system of claim 18, the map a portion of the primary images comprising:

mapping at least a portion of the primary images identified by a section of a secondary grid between the viewpoint and the object or the participant, wherein the secondary grid corresponds to the object or the participant and identifies cells of the virtual grid cells necessary to generate the viewing experience.

* * * * *